(12) United States Patent
Tani et al.

(10) Patent No.: US 8,629,848 B2
(45) Date of Patent: Jan. 14, 2014

(54) PORTABLE TERMINAL APPARATUS

(75) Inventors: Minako Tani, Daito (JP); Takeru Yoshihara, Fujisawa (JP); Tomona Mezaki, Daito (JP); Takeki Aihara, Daito (JP)

(73) Assignee: Kyocera Corporation (JP)

( * ) Notice: Subject to any disclaimer, the term of this patent is extended or adjusted under 35 U.S.C. 154(b) by 115 days.

(21) Appl. No.: 13/114,823

(22) Filed: May 24, 2011

(65) Prior Publication Data

US 2011/0291915 A1    Dec. 1, 2011

(30) Foreign Application Priority Data

May 27, 2010   (JP) ................................. 2010-122138

(51) Int. Cl.
*G06F 3/041*   (2006.01)

(52) U.S. Cl.
USPC .......................................................... 345/173

(58) Field of Classification Search
None
See application file for complete search history.

(56) References Cited

U.S. PATENT DOCUMENTS

| 6,466,202 B1 | 10/2002 | Suso et al. | |
|---|---|---|---|
| 2005/0285811 A1 | 12/2005 | Kawase et al. | |
| 2009/0075702 A1* | 3/2009 | Kubodera et al. | 455/566 |
| 2009/0295731 A1* | 12/2009 | Kim et al. | 345/168 |
| 2010/0117975 A1* | 5/2010 | Cho | 345/173 |
| 2010/0225601 A1* | 9/2010 | Homma et al. | 345/173 |
| 2010/0295808 A1* | 11/2010 | Seo et al. | 345/173 |
| 2010/0328223 A1* | 12/2010 | Mockarram-Dorri et al. | 345/173 |
| 2011/0007465 A1 | 1/2011 | Naito | |
| 2011/0136554 A1* | 6/2011 | Wong et al. | 455/575.4 |

FOREIGN PATENT DOCUMENTS

| JP | 2000-253113 A | 9/2000 |
|---|---|---|
| JP | 2002-044202 A | 2/2002 |
| JP | 2006-010811 A | 1/2006 |
| JP | 2008-299231 A | 12/2008 |
| WO | 2009/110454 A1 | 9/2009 |

OTHER PUBLICATIONS

An Office Action; "Notice of Reasons for Rejection," issued by the Japanese Patent Office on Sep. 20, 2013, which corresponds to Japanese Patent Application No. 2010-122138 and is related to U.S. Appl. No. 13/114,823; with concise explanation.

* cited by examiner

*Primary Examiner* — Joseph Haley
*Assistant Examiner* — Emily Frank
(74) *Attorney, Agent, or Firm* — Studebaker & Brackett PC

(57) ABSTRACT

A portable terminal apparatus is provided. The portable terminal includes a first unit including a first display part, a second unit including a second display part, and a switching part configured to cause the first unit and the second unit to switch between a first position in which the first unit covers the second display part and a second position in which at least a part of the second display part is exposed to an outside. The first unit is configured such that an opposite side of the first unit is visible through the first display part.

10 Claims, 20 Drawing Sheets

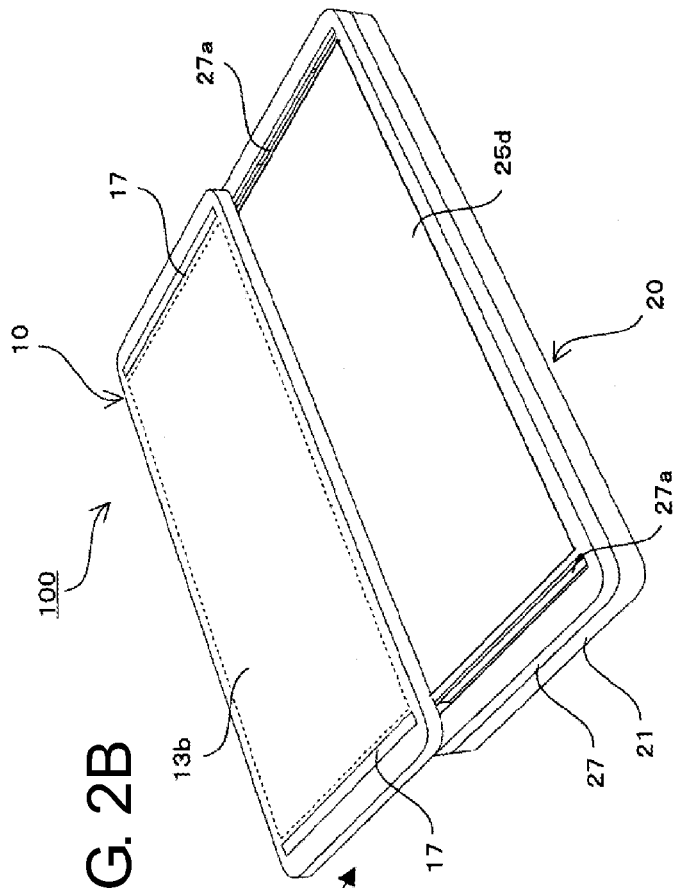
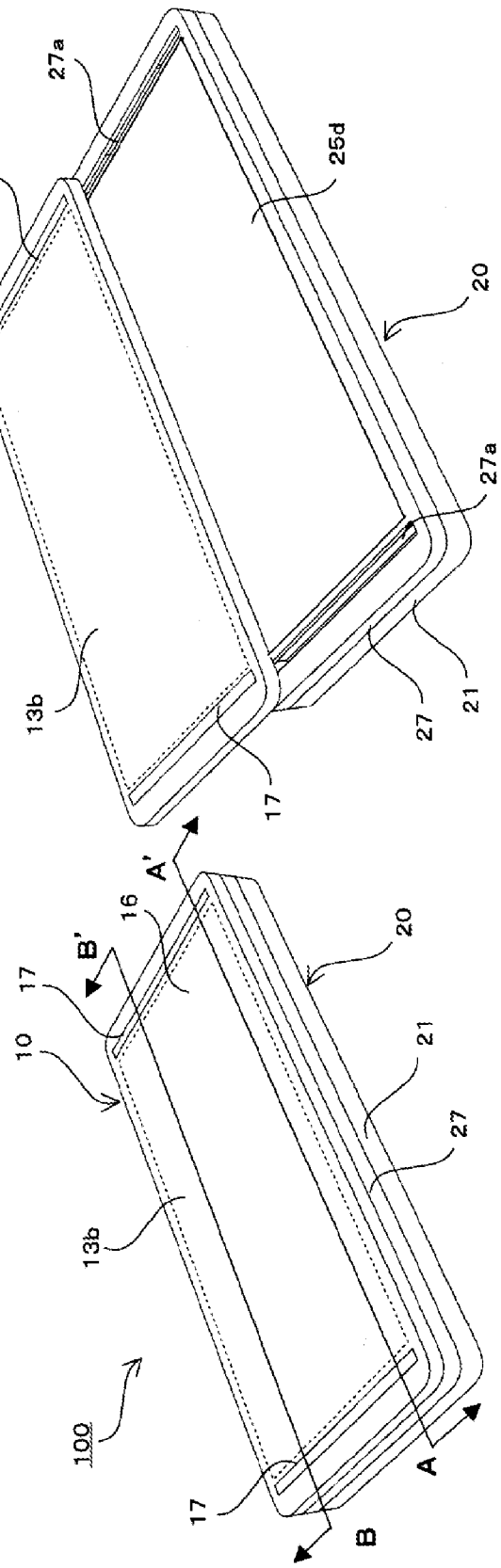
FIG. 2A
FIG. 2B

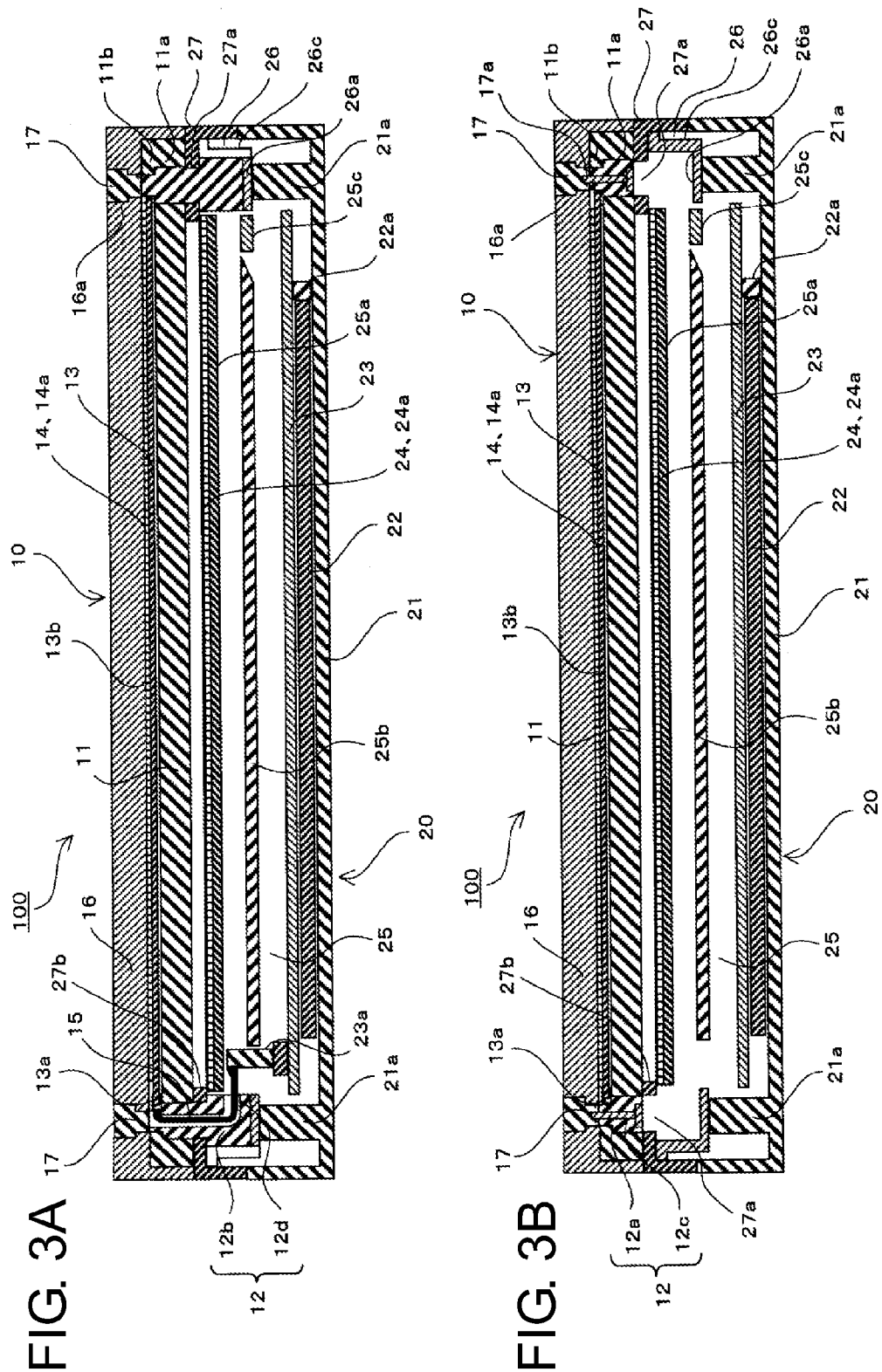

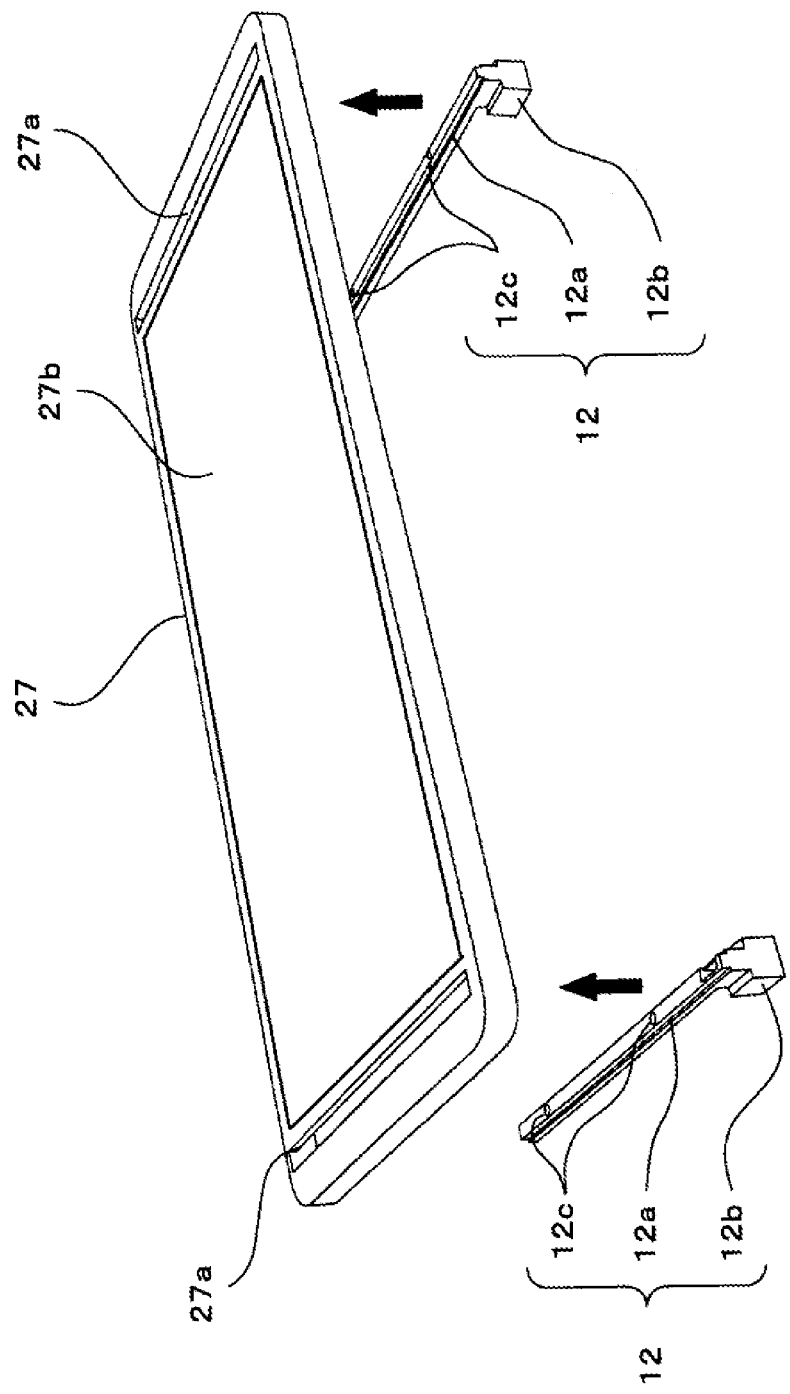

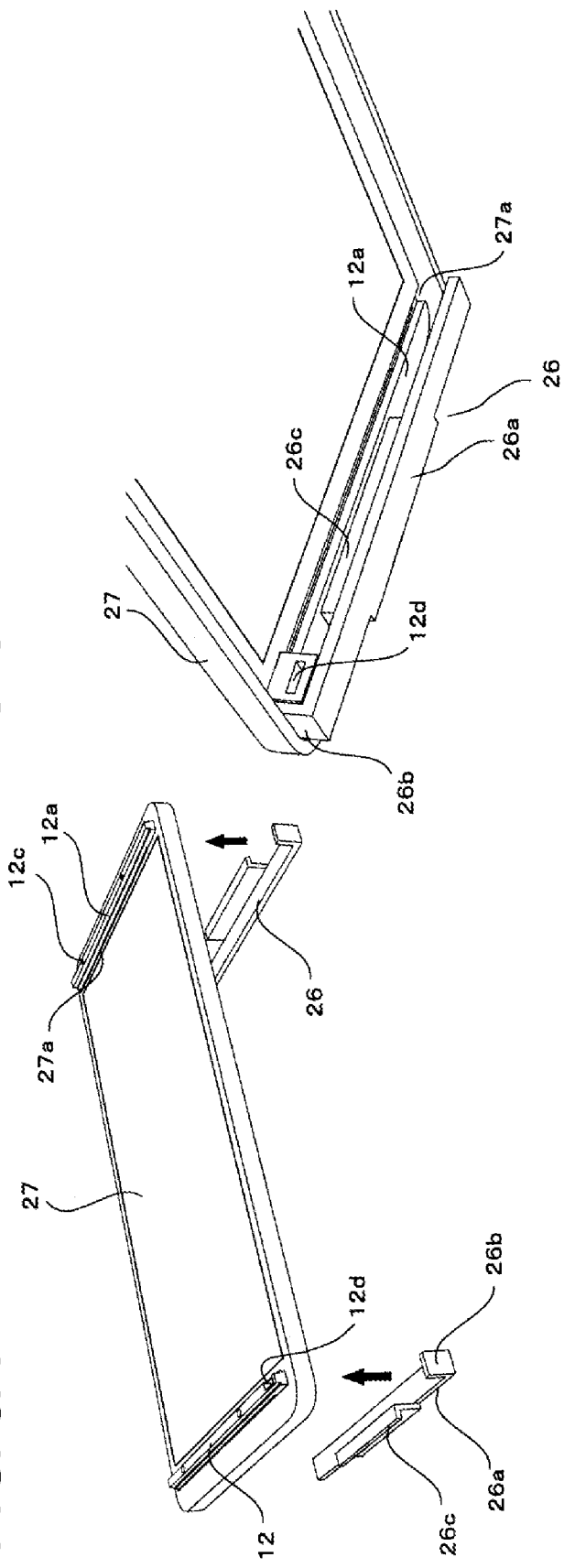

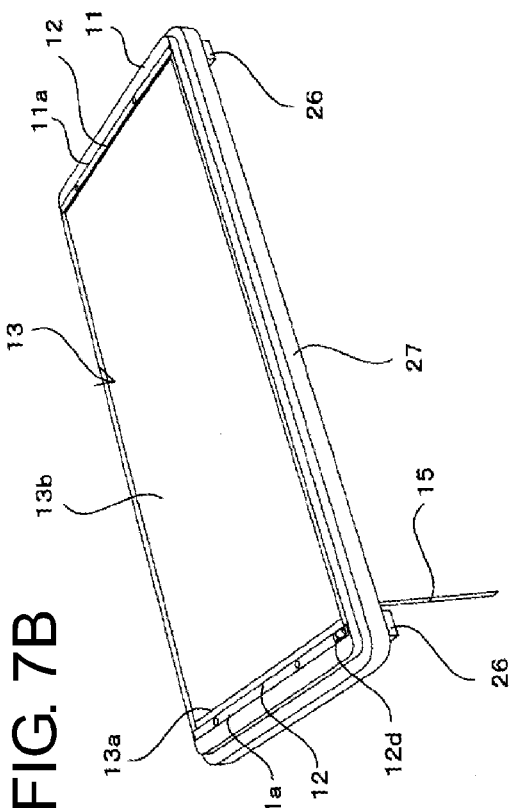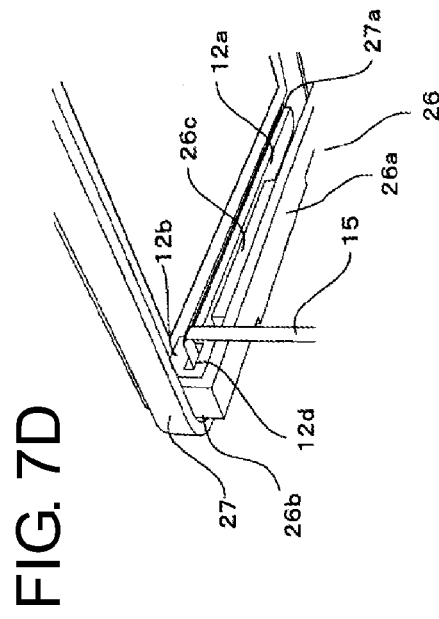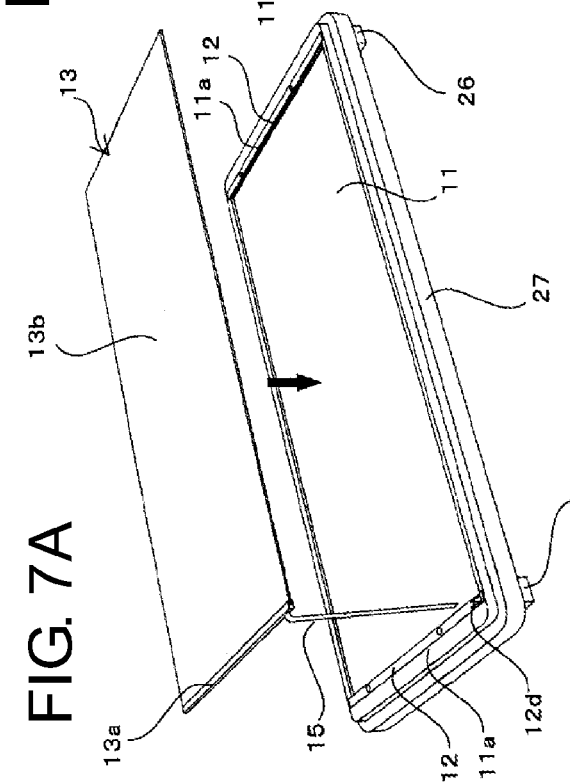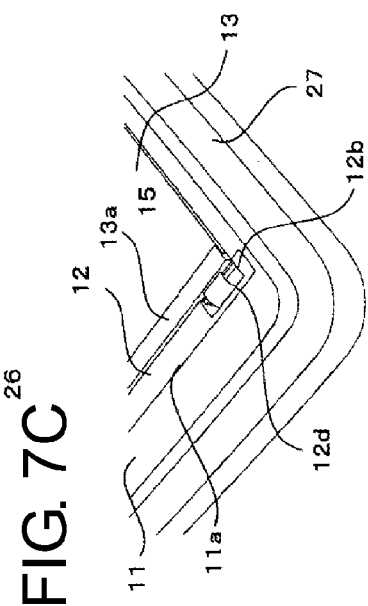

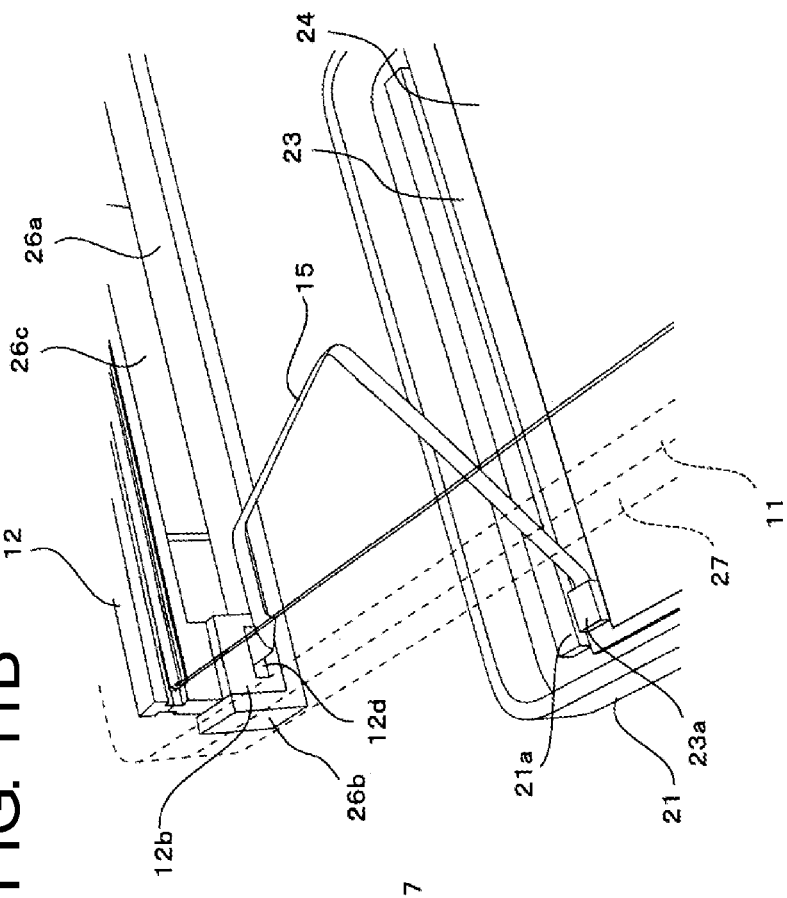
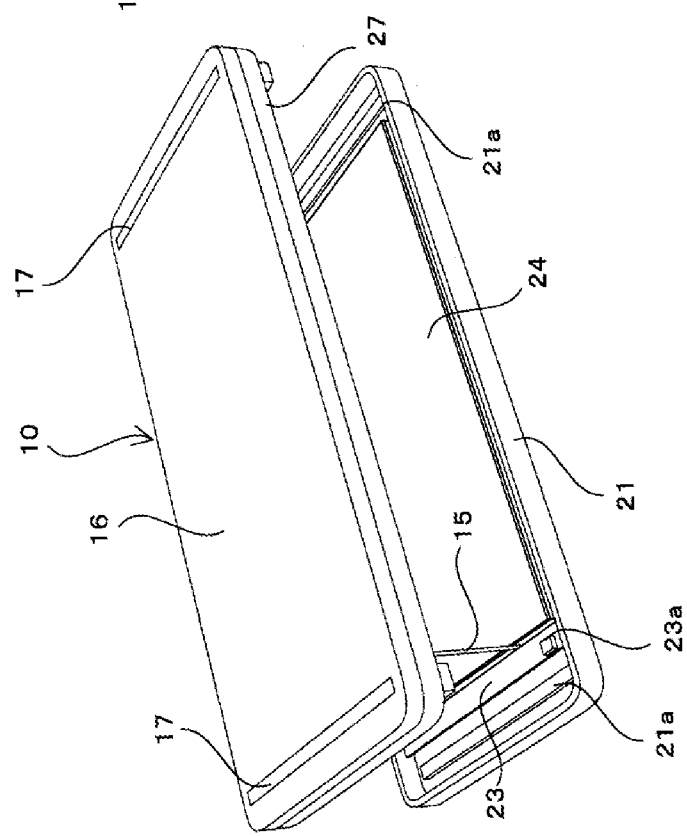

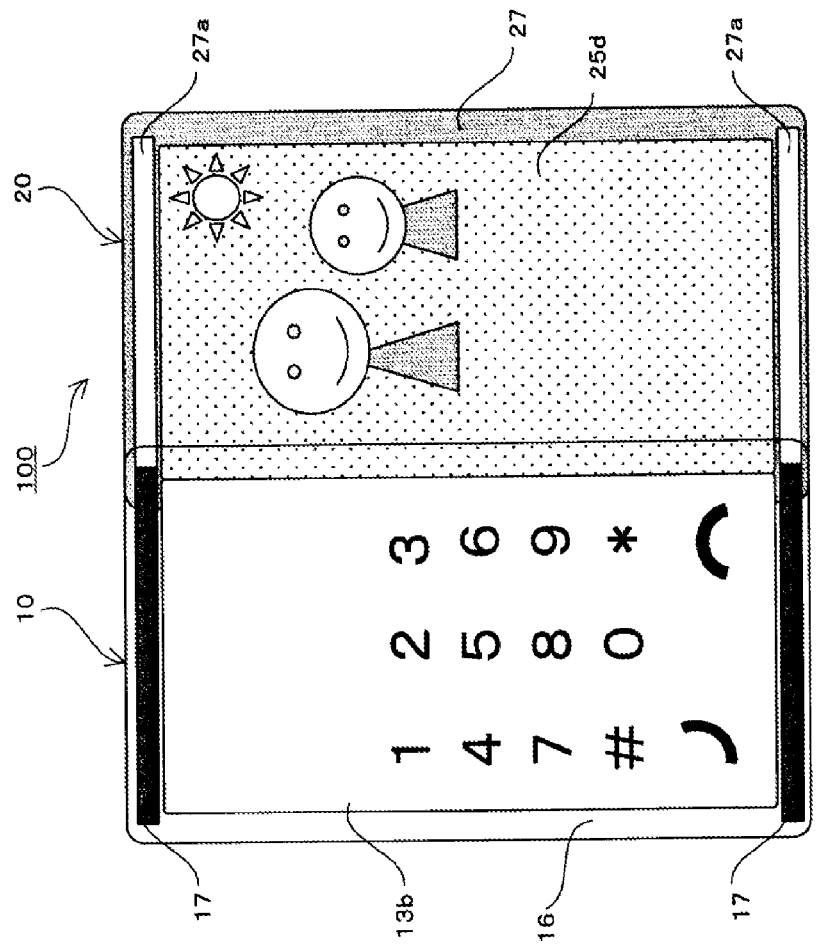
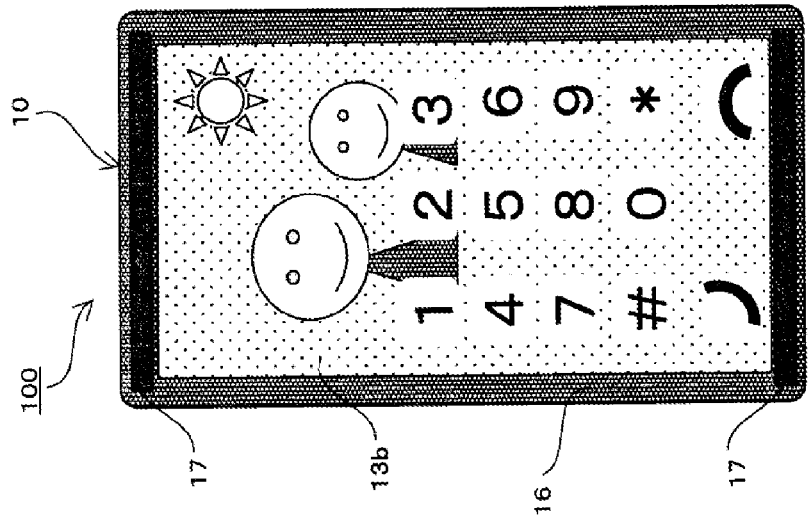
FIG. 13A
FIG. 13B

PORTABLE TERMINAL APPARATUS

CROSS-REFERENCE TO RELATED APPLICATION

This application claims priority from Japanese Patent Application No. 2010-122138, filed on May 27, 2010, the entire subject matter of which is incorporated herein by reference.

BACKGROUND OF THE INVENTION

Field of the Invention

The invention relates to a portable terminal apparatus such as a mobile phone, a Personal Digital Assistant (PDA) and the like.

JP-A-2002-044202 describes a portable terminal apparatus including two cabinets and display surfaces provided to the respective cabinets. In the portable terminal apparatus, when the two cabinets are overlapped, one display surface is exposed, and when the two cabinets are arranged laterally, the two display surfaces are exposed. Also, in the portable terminal apparatus, it is possible to perform an input operation on the display surfaces.

When the two cabinets are overlapped, the apparatus becomes compact, so that portability is improved. When the two cabinets are arranged laterally, a display area and an input area are expanded by the two display surfaces, so that visibility and operability are improved.

However, according to the above related art, the two display surfaces have the same function. Accordingly, when the two display surfaces are arranged laterally, the display area and the input area are just expanded. In other words, only the functions resulting from the expansion can be achieved by the related-art portable terminal apparatus.

In addition, according to the related art, at the state in which the two cabinets are overlapped, the display and input operations can be performed only on the upper display surface, and the lower display surface cannot be used.

SUMMARY OF THE INVENTION

According to an aspect of the present invention, there is provided a portable terminal apparatus capable of improving convenience and fun.

According to an illustrative embodiment of the present invention, there is provided a portable terminal apparatus comprising: a first unit including a first display part; a second unit including a second display part; and a switching part configured to cause the first unit and the second unit to switch between a first position in which the first unit covers the second display part and a second position in which at least a part of the second display part is exposed to an outside. The first unit is configured such that an opposite side of the first unit is visible through the first display part.

According to the above configuration, it is possible to provide a portable terminal apparatus capable of improving convenience and fun.

The effects and significances of the invention will be further clarified with reference to the illustrative embodiments. The below illustrative embodiments are simply exemplary and the invention is not limited to the illustrative embodiments.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 2A and 2B are perspective views showing the whole portable terminal apparatus according to an illustrative embodiment;

FIGS. 3A and 3B are sectional views showing the portable terminal apparatus according to an illustrative embodiment;

FIG. 4 is a perspective view showing a state in which a slide part is arranged below a second cover part according to an illustrative embodiment;

FIGS. 5A and 5B are perspective views showing a state in which a bearing part is attached to the second cover part according to an illustrative embodiment;

FIGS. 7A to 7D are perspective views showing a state in which a first display part is received in a first cover part according to an illustrative embodiment;

FIGS. 11A and 11B are perspective views showing a state in which a second bottom part is attached to the second cover part according to an illustrative embodiment;

FIGS. 13A and 13B are perspective views showing states of the portable terminal apparatus according to an illustrative embodiment;

DETAILED DESCRIPTION OF THE INVENTION

Hereinafter, a portable terminal apparatus according to an illustrative embodiment will be described with reference to the drawings.

<Configuration of Portable Terminal Apparatus>

Figure 1:
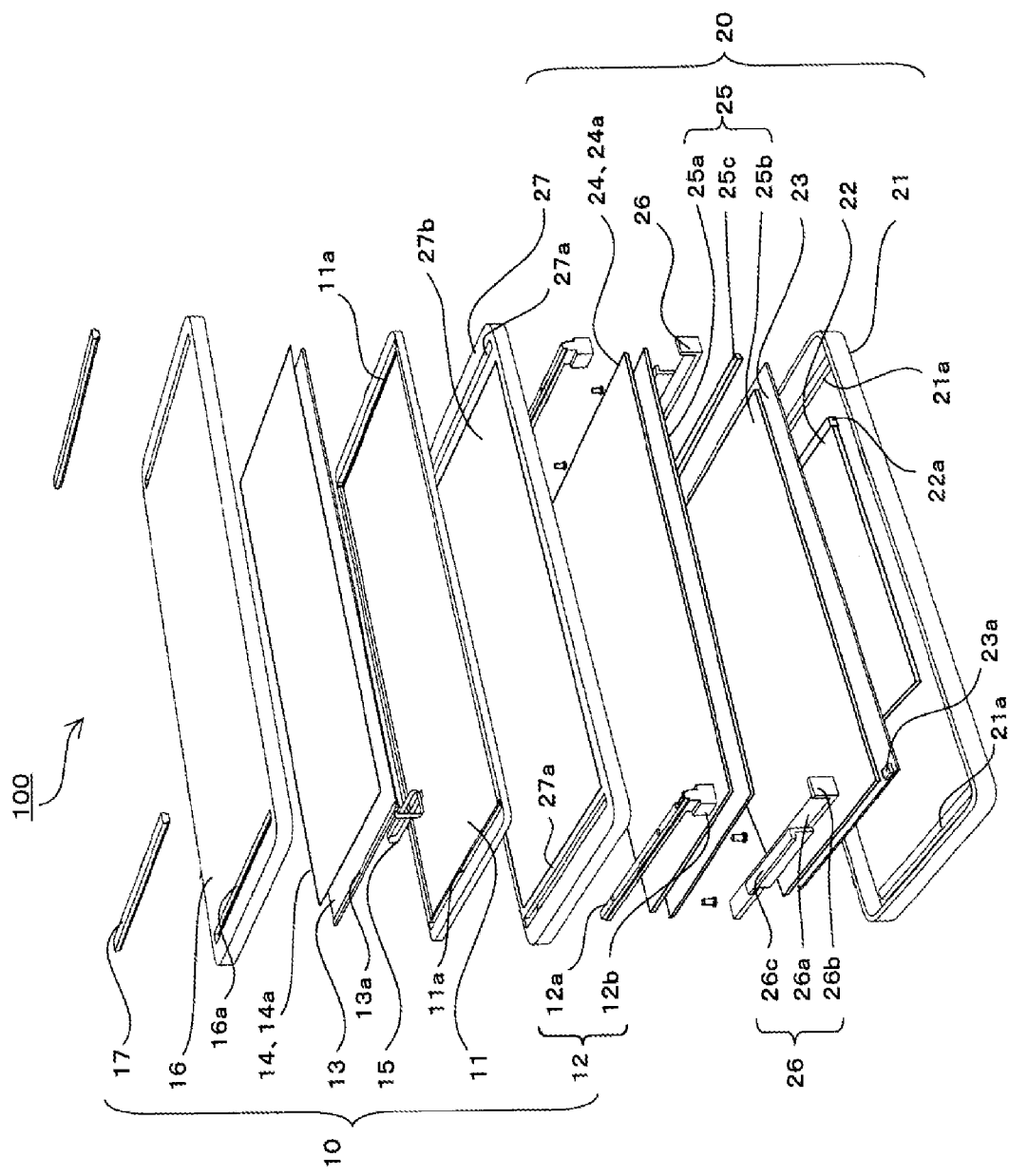
FIG. 1 is an exploded perspective view showing a portable terminal apparatus according to an illustrative embodiment.

FIG. 1 is an exploded perspective view showing an entire configuration of a portable terminal apparatus 100. FIG. 2A is a perspective view showing a state in which a first unit 10 of the portable terminal apparatus 100 is overlapped over a second unit 20. FIG. 2B is a perspective view showing a state in which the first unit 10 and second unit 20 of the portable terminal apparatus 100 are arranged laterally. FIG. 3A is a sectional view taken along a line A-A' of FIG. 2A. FIG. 3B is a sectional view taken along a line B-B' of FIG. 2A. In this illustrative embodiment, the first unit 10 is configured to be arranged above the second unit 20, and a direction along which the first unit 10 and the second unit 20 are overlapped in the state where the portable terminal apparatus 100 is put horizontally is referred to as a vertical direction and a direction perpendicular to the vertical direction is referred to as a lateral direction.

As shown in FIGS. 2A and 2B, the portable terminal apparatus 100 has the first unit 10 and the second unit 20. The first unit 10 is overlapped on the second unit 20 to be slidable with respect to the second unit 20.

As shown in FIGS. 1, 3A and 3B, the first unit 10 has a first bottom part 11, slide parts 12 that are provided to the first bottom part 11, a first display part 13 and a first input part 14, which are received in the first bottom part 11, a wiring 15 that is connected to the first display part 13, a first cover part 16 that covers the first display part 13 and covering parts 17 that are mounted on the first cover part 16.

The first bottom part 11 is injection-molded by a transparent resin such as polycarbonate or acryl. The first bottom part 11 has a rectangular shape and is slightly recessed in a rectangular shape at a center thereof. The first bottom part 11 is formed with two bottom through-holes 11a with an interval therebetween. The respective bottom through-holes 11a penetrate the first bottom part 11. The bottom through-holes 11a have an elongated shape and are formed to be parallel at an interval with respect to short sides of the first bottom part 11, respectively. Protrusions 11b are provided on the respective bottom through-holes 11a. The protrusion 11b extends over an entire length of the bottom through-hole 11a and protrudes in a direction of covering the bottom through-hole 11a from an edge of the recessed part.

The slide part 12 has a shaft part 12a and an engagement part 12b. The shaft part 12a has an elongated shape and includes an upper portion and a lower portion. A width of the upper portion of the shaft part 12a is narrower than that of the lower portion. A step is formed between the upper portion and the lower portion. The shaft part 12a is formed with two insertion holes 12c at an interval. The insertion holes 12c penetrate the shaft part 12a.

The engagement part 12b is provided at an end of the shaft part 12a and has an upper portion, a central portion and a lower portion. A width of the upper portion of the engagement part 12b is the same as that of the upper portion of the shaft part 12a and the upper portion of the engagement part 12b continues to the upper portion of the shaft part 12a. A width of the central portion of the engagement part 12b is the same as that of the lower portion of the shaft part 12a and the central portion of the engagement part 12b continues to the lower portion of the shaft part 12a. A height of the central portion of the engagement part 12b is larger than that of the lower portion of the shaft part 12a and the central portion of the engagement part 12b protrudes more downwardly than the lower portion of the shaft part 12a. A width of the lower portion of the engagement part 12b is larger than that of the central portion of the engagement part 12b and a step is formed between the lower portion and the central portion. In addition, the engagement part 12b is formed with a through-hole 12d. The through-hole 12d penetrates the upper, central and lower portions of the engagement part 12b and is opened at a side of the lower portion.

The first display part 13 has a rectangular flat plate shape and configured by a transparent liquid crystal display, for example. The liquid crystal display has only a liquid crystal panel whose display mode is normally white and an illumination part (backlight) is not arranged at a backside of the liquid crystal panel. In the meantime, the liquid crystal panel is configured by sandwiching a transparent liquid crystal (not shown) and transparent electrodes (not shown) between two transparent plates (not shown).

In the meantime, as the transparent liquid crystal display, a configuration may be used in which an illumination part configured by a transparent light guide plate and a light source part is arranged on a backside of a liquid crystal panel.

An electrode 13a is provided at one of two short sides of the first display part 13. The electrode 13a is connected to the transparent liquid crystal display.

The wiring 15 is connected to an end of the electrode 13a of the first display part 13. As the wiring 15, a flexible wiring (flexible substrate) is used.

The first input part 14 includes a position sensor 14a, an image sensor 14b and the like and wirings (not shown) are connected to the sensors. A touch panel and the like are used as the position sensor 14a. The touch panel is a transparent sheet having a rectangular shape and two transparent electrodes (not shown) are inserted therein in a matrix shape. The touch panel detects a change in electrostatic capacitances between the transparent electrodes to detect a position to which a finger and the like of a user approaches (or contacts), thereby outputting a signal corresponding to the position.

The first cover part 16 is injection-molded by a transparent resin such as polycarbonate or acryl. The first cover part 16 has a rectangular top surface and four sides and is opened downwards. The first cover part 16 is provided at its top surface with two cover through-holes 16a that penetrate the top surface. The cover through-holes 16a have an elongated shape and are formed to be parallel at an interval with respect to short sides of the first cover part 16. A width of an upper portion of the cover through-hole 16a is wider than that of a lower portion thereof and a step is formed between the upper portion and the lower portion.

The covering part 17 has an elongated shape and is injection-molded by an opaque resin. A width of an upper portion of the covering part 17 is wider than that of a lower portion thereof and a step is formed between the upper portion and the lower portion. The covering part 17 is formed with two screw holes 17a with an interval therebetween. The screw holes 17a do not penetrate the upper portion of the covering part 17 and a top surface of the covering part 17 is formed as flat.

The second unit 20 has a second bottom part 21, an battery 22, a substrate 23, a second input part 24, a second display part 25 and bearing parts 26, which are received in the second bottom part 21, and a second cover part 27 that covers the second display part 25.

The second bottom part 21 has a rectangular bottom and four sides surrounding the rectangular bottom and is opened upwards. Support parts 21a are provided at inner sides of the two short sides, respectively. The support parts 21a have a rectangular parallelepiped shape, respectively, and extend in parallel with the short sides at an interval thereto.

The battery has a thin rectangular parallelepiped shape and the substrate 23 has a flat plate shape. The battery 22 and the substrate 23 are connected to each other by a connector 22a. Electronic parts (not shown) such as CPU 23b, memory 23c and the like and the connector 23a are disposed on a surface of the substrate 23 and the electronic parts and the like are connected each other by wirings (not shown).

The second display part 25 is a non-transparent liquid crystal display, for example, and includes a liquid crystal panel 25a and a light guide plate 25b and a light emitting part 25c for illuminating the liquid crystal panel 25a. The liquid crystal panel 25a is configured by sandwiching a transparent liquid crystal (not shown) and transparent electrodes (not shown) between two transparent plates (not shown). The light guide plate 25b and the light emitting part 25c are arranged on a backside of the liquid crystal panel 25a.

The second input part 24 includes a position sensor 24a. As the position sensor 24a, a touch panel is used, for example. The touch panel is a transparent sheet having a rectangular shape. Two transparent electrodes (not shown) are inserted in the touch panel in a matrix shape and a wiring (not shown) is connected to the transparent electrodes.

The bearing part 26 includes a bottom surface plate 26a, a first side plate 26b and a second side plate 26c. The bottom surface plate 26a has an elongated rectangular shape. The first side plate 26b has a rectangular shape and stands upright from a short side of the bottom surface plate 26a. The second side plate 26c stands upright from a long side of the bottom surface plate 26a and has a leading end portion that is bend to be parallel with the bottom surface plate 26a.

The second cover part 27 has a rectangular top surface and four sides surrounding the top surface and is opened downwards. The top surface is formed with two guide holes 27a with an interval therebetween, which penetrate the top surface. The guide holes 27a have an elongated shape, respectively and extend in parallel with the short sides of the top surface at an interval thereto. The second cover part 27 is formed with a display window 27b at a center thereof, and a second display surface 25d of the second display part 25 exposes to the outside through the display window 27b.

<Assembling of Portable Terminal Apparatus>

FIG. 4 is a perspective view showing a state in which the two slide parts 12 are arranged below the second cover part 27. As shown in FIG. 4, the slide parts 12 are fitted into the guide holes 27a from the lower side of the second cover part 27. A length of the slide part 12 is the same as that of the guide hole 27a and the slide part 12 extends over the entire length of the guide hole 27a. As shown in FIGS. 3A and 3B, since the width of the shaft part 12a of the slide part 12 and the width of the upper portion of the engagement part 12b are formed to be slightly smaller than the width of the guide hole 27a, the shaft part 12a of the slide part 12 and the upper portion of the engagement part 12b protrude upwards from the surface of the second cover part 27 through the guide hole 27a. Since the width of the lower portion of the engagement part 12b is formed to be larger than the width of the guide hole 27a, the lower portion of the engagement part 12b is brought into contact with an edge of the second cover part 27 surrounding the guide hole 27a and is disposed in the second cover part 27.

FIG. 5A is a perspective view showing a state in which the two bearing parts 26 are arranged below the second cover part 27. FIG. 5B is a perspective view showing a state in which the bearing part 26 is attached to the second cover part 27. As shown in FIGS. 5A and 5B, the bearing parts 26 are disposed below the guide holes 27a from the lower side of the second cover part 27. The first side plate 26b of the bearing part 26 faces the engagement part 12b of the slide part 12 and the first side plate 26b and the bottom surface plate 26a surround the engagement part 12b. The second side plate 26c faces the short side of the second cover part 27 and the leading end portion of the second side plate 26c is brought into contact with the upper surface and side surface of the second cover part 27, as shown in FIGS. 3A and 3B. Thereby, the second side plate 26c is parallel with the side surface of the engagement part 12b. In addition, the bottom surface plate 26a of the bearing part 26 is parallel with the lower surface of the engagement part 12b below the guide hole 27a.

Figure 6:
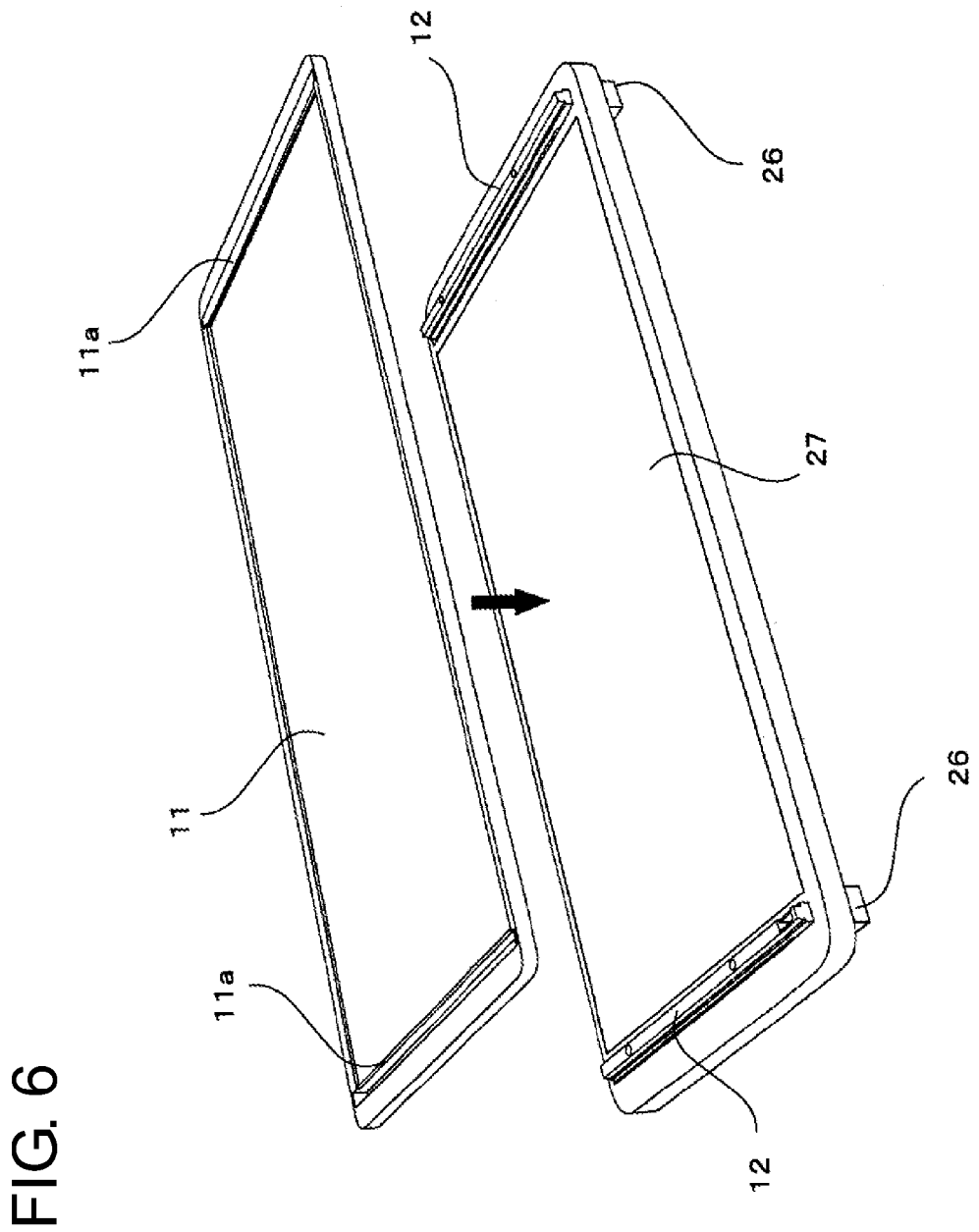
FIG. 6 is a perspective view showing a state in which a first bottom part is put on the second cover part according to an illustrative embodiment.

FIG. 6 is a perspective view showing a state in which the first bottom part 11 is arranged above the second cover part 27. As shown in FIG. 6, since the slide parts 12 protrude upwardly from the second cover part 27, the first bottom part 11 is put on the second cover part 27 so that the slide parts 12 are fitted into the bottom through-holes 11a of the first bottom part 11. As shown in FIGS. 3A and 3B, the width of the shaft part 12a and the widths of the upper and central portions of the engagement part 12b are formed to be slightly smaller than the width of the bottom through-hole 11a and the shaft part 12a and the upper and central portions of the engagement part 12b are fitted into the bottom through-hole 11a. The height of the lower portion of the shaft part 12a is the same as the height of the bottom through-hole 11a, the step of the shaft part 12a contacts the protrusion 11b and the lower portion of the shaft part 12a is received in the cover through-hole 16a. The upper surface of the shaft part 12a is flush with the surface of the first bottom part 11. Thereby, the shaft part 12a is arranged higher than the upper surface of the second cover part 27.

FIG. 7A is a perspective view showing a state in which the first display part 13 is arranged above the first bottom part 11. FIG. 7B is a perspective view showing a state in which the first display part 13 is received in the recessed part of the first bottom part 11. FIG. 7C is a perspective view showing a state in which the wiring 15 is enabled to pass through the through-hole 12d of the engagement part 12b, from the above of the first bottom part 11. FIG. 7D is a perspective view showing a state in which the wiring 15 is allowed to pass through the through-hole 12d of the engagement part 12b, from the below of the second cover part 27.

As shown in FIGS. 7A to 7D, the first display part 13 is fixed into the recessed part of the first bottom part 11 so that the first display surface 13b becomes an upper side and the wiring 15 is allowed to pass through the through-hole 12d of the engagement part 12b. A size of the recessed part of the first bottom part 11 is the same as that of the first display part 13. Thus, when the first display part 13 is fitted into the recessed part of the first bottom part 11, the first display part 13 is positioned. Since the recessed part of the first bottom part 11 is formed between the two bottom through-holes 11a, the first display part 13 is arranged between the two bottom through-holes 11a. As shown in FIGS. 3A and 3B, the wiring 15 passes through the through-hole 12d of the engagement part 12b and the guide hole 27a, comes out laterally from the side of the engagement part 12b and is then guided into the second cover part 27.

In addition, the first input part 14 is overlapped over the first display part 13. A size of the first input part 14 is the same as that of the first display part 13 and the first input part 14 covers the entire surface of the first display part 13. The wiring of the first input part 14 passes through the through-hole 12d of the engagement part 12b and the guide hole 27a and is then guided into the second cover part 27, like the wiring 15 of the first display part 13.

Figure 8A:
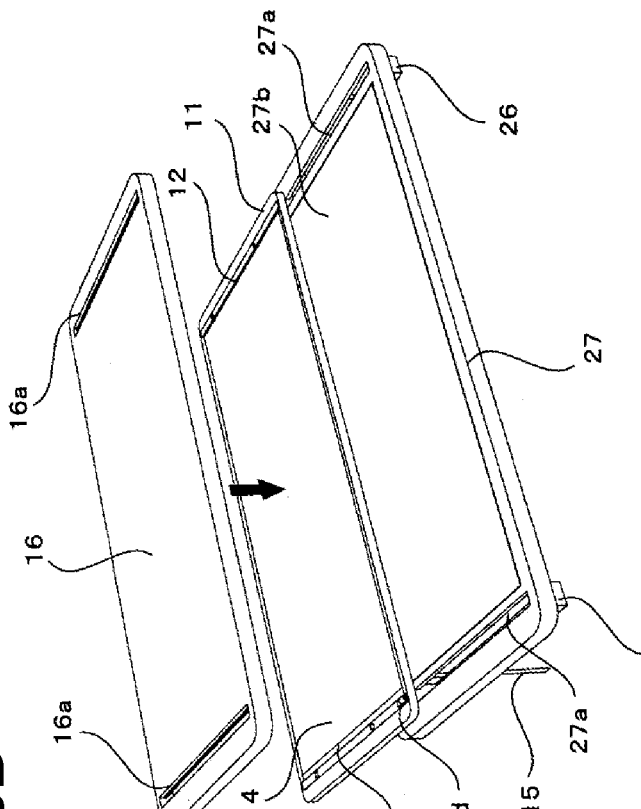
FIGS. 8A and 8B are perspective views showing a state in which the first bottom part is covered by a first cover part according to an illustrative embodiment.
Figure 8B:
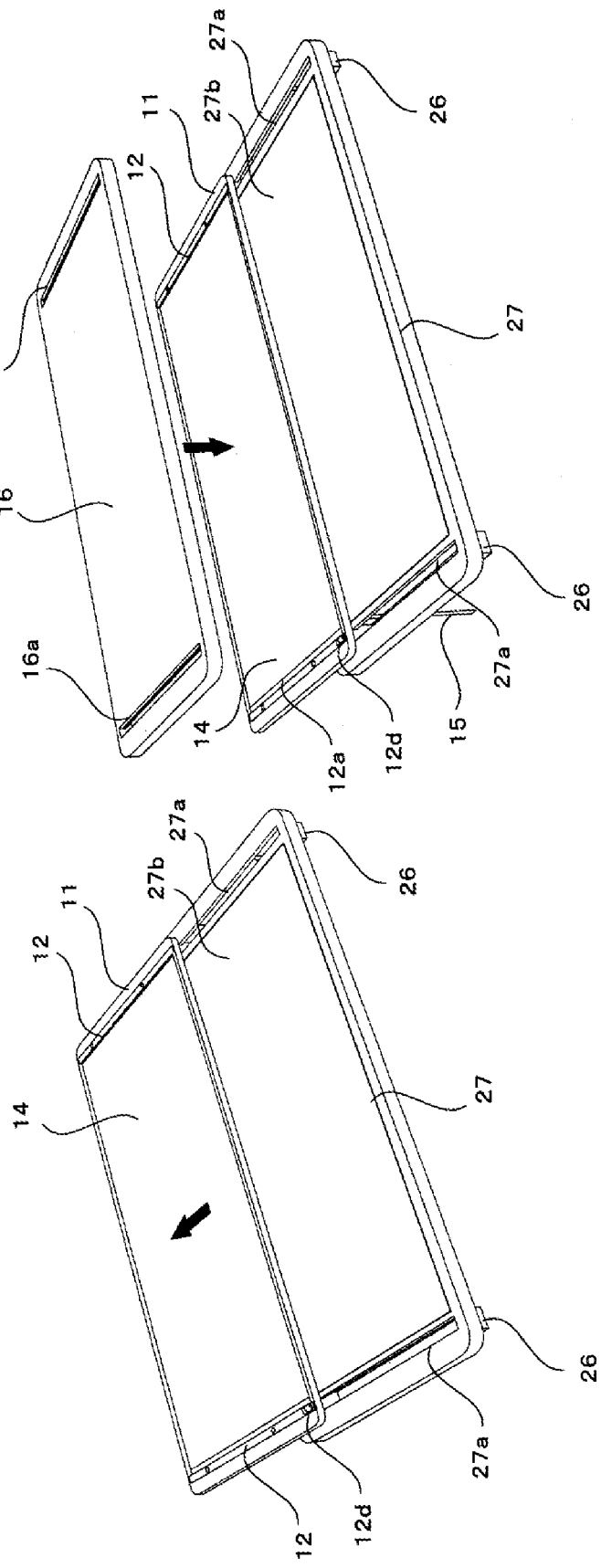

FIG. 8A is a perspective view showing a state in which the first bottom part 11 is arranged laterally with the second cover part 27. FIG. 8B is a perspective view showing a state in which the first cover part 16 is arranged above the first bottom part 11. As shown in FIGS. 8A and 8B, the first bottom part 11 slides relatively to the second cover part 27 in an arrow direction of FIG. 8A and is thus arranged laterally with the second cover part 27. The first cover part 16 is put on the first bottom part 11 so that the first cover part covers the first input part 14. As shown in FIG. 3, a size of the first bottom part 11 is slightly smaller than a size surrounded by the sides of the first cover part 16 and the first bottom part 11 is thus received in the first cover part 16. The first display surface 13b is opposed to the top surface of the first cover part 16 through the first input part 14. In addition, the cover through-holes 16a of the first cover part 16 are arranged above the slide parts 12 and the guide holes 27a.

Figure 9A:
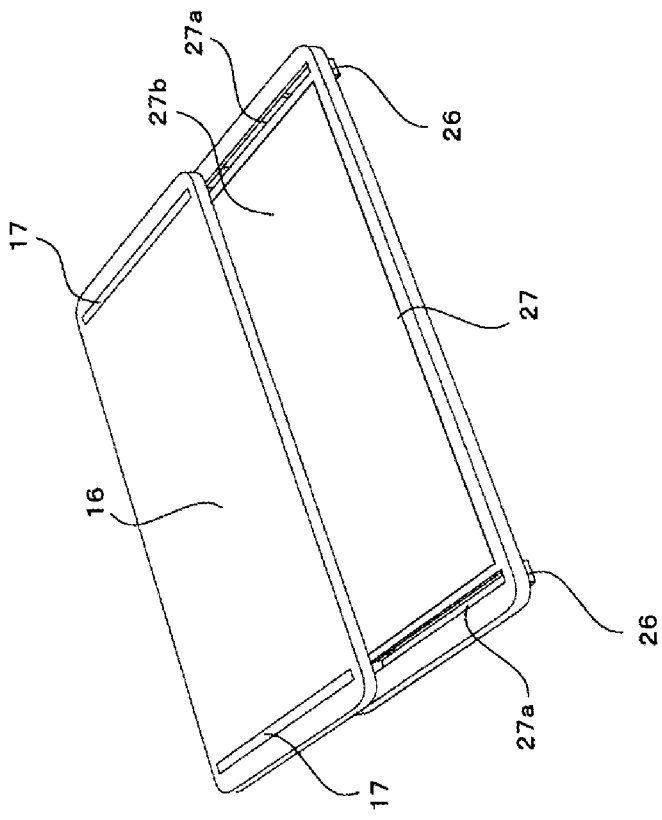
FIGS. 9A and 9B are perspective views showing a state in which covering parts are fitted in cover through-holes of the first cover part according to an illustrative embodiment.
Figure 9B:
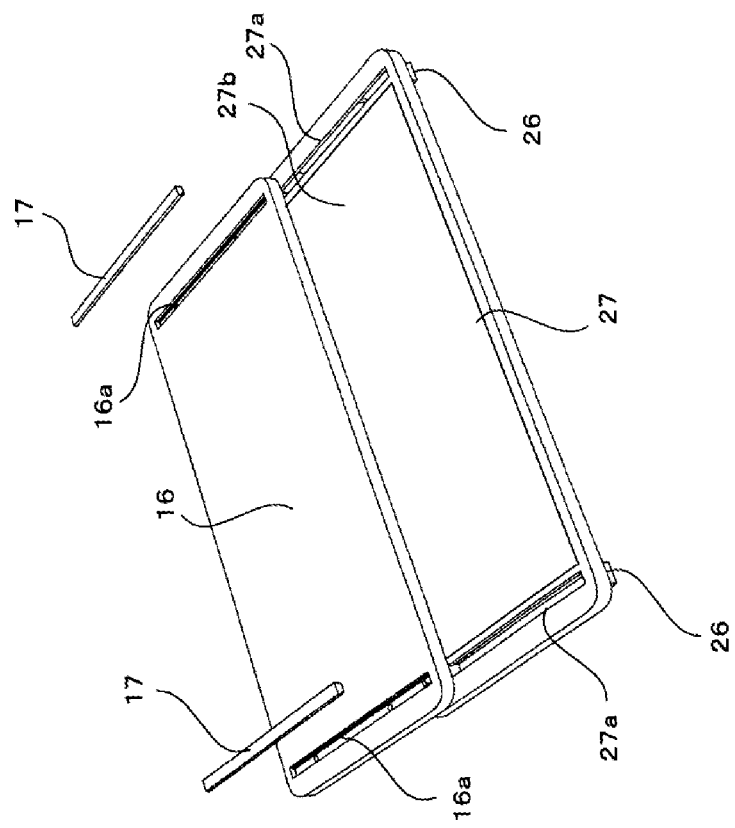

FIG. 9A is a perspective view showing a state in which the covering parts 17 are arranged above the cover through-holes 16a of the first cover part 16. FIG. 9B is a perspective view showing a state in which the covering parts 17 are fitted in the cover through-holes 16a of the first cover part 16. As shown in FIGS. 9A and 9B, the covering parts 17 are fitted into the opened cover through-holes 16a. Since a size of the covering part 17 is the same as that of the cover through-hole 16a, the covering part 17 plugs the cover through-hole 16a. As shown in FIGS. 3A and 3B, the covering parts 17 are overlapped over the guide holes 27a and the slide parts 12. A width of the covering part 17 is the same as or larger than those of the guide hole 27a and the slide part 12. Thus, the covering parts 17 cover the guide holes 27a and the slide parts 12, so that the guide holes 27a and the slide parts 12 are hidden below the opaque covering parts 17. In addition, the first bottom part 11, the first display part 13, the first input part 14 and the first cover part 16 are overlapped and are transparent between the two covering parts 17. At the outer sides of the two covering parts 17, the first bottom part 11 and the first cove part 16 are overlapped and are also transparent. Accordingly, regarding the first unit 10, the range of the first display surface 13b is transparent and the surrounding of the first display surface 13b is also transparent except for the covering parts 17.

Figure 10A:
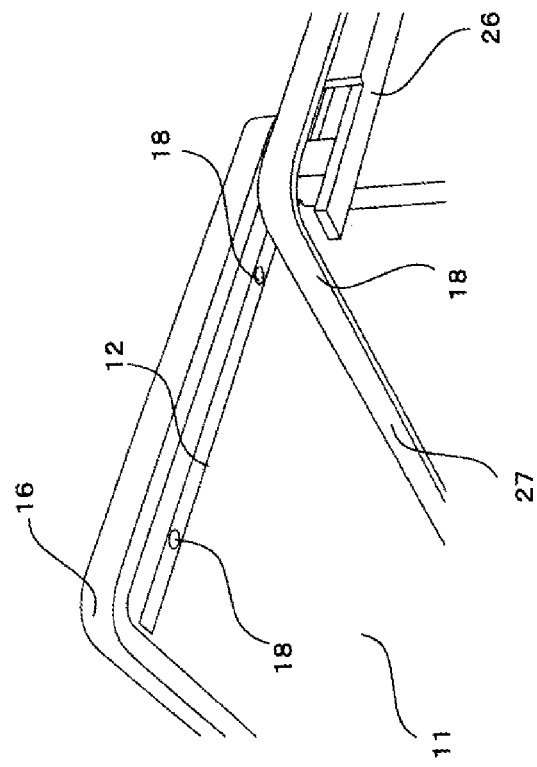
FIGS. 10A and 10B are perspective views showing a state in which the slide part and the covering part are fixed by screws according to an illustrative embodiment.
Figure 10B:
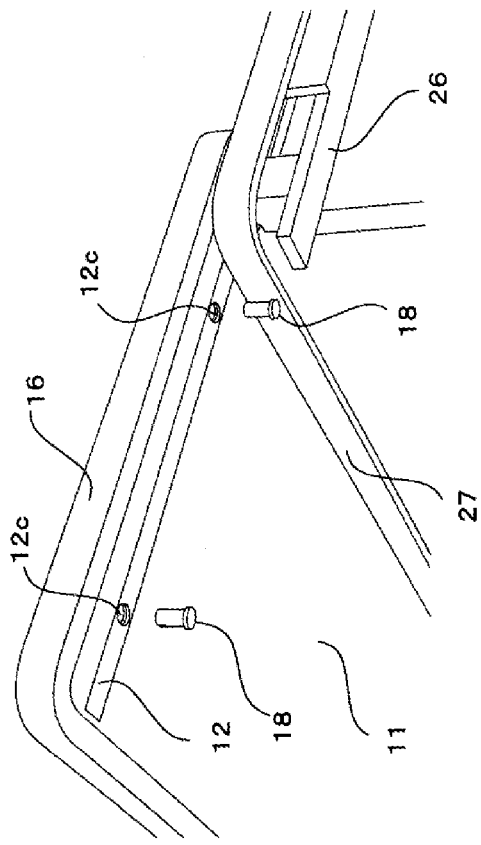

FIG. 10A is a perspective view showing the slide part 12, which is seen from the below of the first bottom part 11. FIG. 10B is a perspective view showing a state in which the screws 18 are engaged with the slide part 12, which is seen from the below of the first bottom part 11. As shown in FIGS. 10A and 10B, the screws 18 are inserted into the insertion holes 12c of the slide part 12. As shown in FIGS. 3A and 3B, the positions of the screw holes 17a of the covering parts 17 are consistent with those of the insertion holes 12c of the slide parts 12 and the screw holes 17a and the insertion holes 12c are thus continuous. Accordingly, the screws 18 pass through the insertion holes 12c and are then fitted into the screw holes 17a. In addition, the steps of the covering parts 17 are brought into contact with the steps of the cover through-hole 16a, so that the covering parts 17 are positioned. Thereby, the slide parts 12 and the covering parts 17 are connected in the vertical direction and the first cover part 16 and the first bottom part 11 are fixed through the slide parts and the covering parts, so that the first unit 10 is assembled. In addition, the engagement parts 12b are engaged with the edges of the first cover part 16 surrounding the guide holes 27a and the first unit 10 is thus coupled to the second cover part 27.

FIG. 11A is a perspective view showing a state in which the second cover part 27 is arranged above the second bottom part 21. FIG. 11B is a perspective view showing a state in which the wiring 15 is connected to the connector 23a of the substrate 23. In FIG. 11B, the first cover part 16 and the second cover part 27 are shown with dotted lines so as to easily see the wiring 15.

As shown in FIGS. 11A, 11B, 3A and 3B, the battery 22 is disposed in the second bottom part 21 and the substrate 23 is overlapped over the battery 22. The connector 22a provided at the side of the battery 22 is connected to the substrate 23. The substrate 23 is arranged so that the connector 23a of the substrate 23 is positioned at the side of the through-hole 12d of the engagement part 12b in the upward direction. The light guide plate 25b, the second display part 25 and the second input part 24 are sequentially overlapped over the substrate 23 and the light emitting part 25c is arranged at the side of the light guide plate 25b. The wirings (not shown) are respectively arranged to the light emitting part 25c, the liquid crystal panel 25a and the second input part 24 and are connected to the substrate 23. Since a size of the second input part 24 is the same as that of the second display part 25, the second input part 24 covers the entire surface of the second display part 25. The first input part 14 and the wiring 15 of the first display part 13 are connected to the connector 23a of the substrate 23 and then the second cover part 27 and the second bottom part 21 are connected, so that the second unit 20 is assembled. The support parts 21a are brought into contact with the bottom surfaces of the bearing parts 26, so that the bearing parts 26 are supported to the support parts 21a. In addition, the second display surface 25d is opposed to the top surface of the second cover part 27 and the second input part 24 is disposed between the second display surface 25d and the top surface of the second cover part 27.

<Circuit of Portable Terminal Apparatus>

Figure 12:
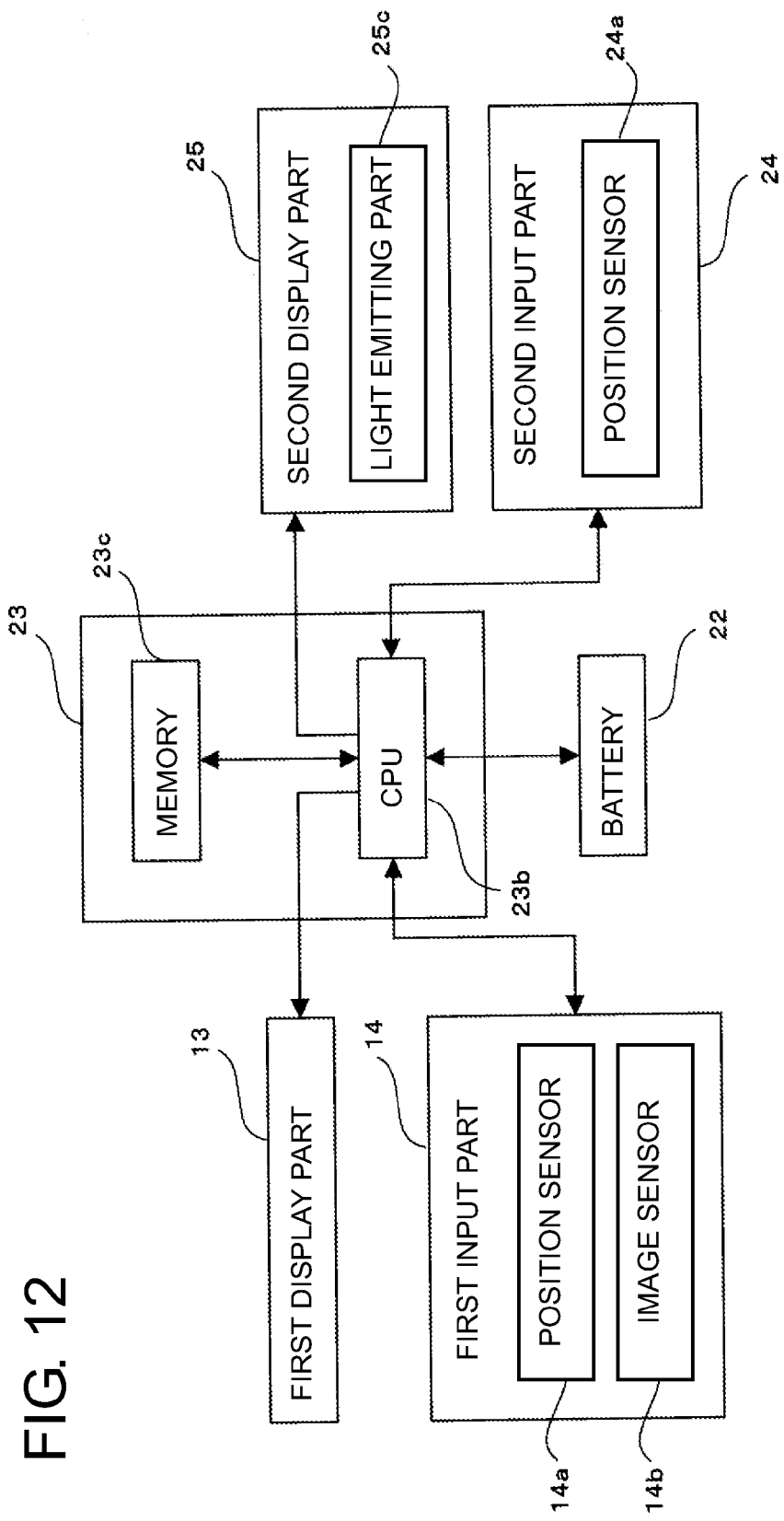
FIG. 12 is a block diagram showing a circuit of the portable terminal apparatus according to an illustrative embodiment.

FIG. 12 is a block diagram of the portable terminal apparatus 100.

The power is supplied from the battery 22 to the CPU 23b, the first display part 13 and the second display part 25. The first display part 13 and the second display part 25 are connected to the substrate 23 by the wirings and transmit and receive signals to and from the CPU 23b of the substrate 23. In other words, the respective display parts 13, 25 receive image signals from the CPU 23b of the substrate 23. Based on the image signals, voltages are applied to the transparent electrodes of the respective display parts 13, 25, so that orientations of the liquid crystals are changed and the light passing through the liquid crystals is modulated. Thereby, images, for example figures such as icons and keyboard, photographs, characters, pictures, windows and the like are displayed on the respective display surfaces 13b, 25d of the display parts 13, 25. The first display part 13 is configured by the transparent liquid crystal panel, and the first cover part 16, the first input part 14 and the first bottom part 11 sandwiching the first display part 13 are transparent. Accordingly, the range of the first display part 13 in which the light penetrates is transparent or semi-transparent and the opposite side can be seen through these components.

In addition, the power is supplied from the battery 22 to the light emitting part 25c of the second display part 25, based on the signal from the CPU 23b, so that the light emitting part 25c emits the light. As shown in FIGS. 3A and 3B, the emitted light is incident into the light guide plate 25b from the side of the light guide plate 25b and is reflected inside the light guide plate 25b and a part of the light is radiated from the surface of the light guide plate 25b to the liquid crystal panel 25a. Thereby, the light is uniformly generated from the entire light guide plate 25b, so that the light illuminates the liquid crystal panel 25a.

As shown in FIG. 12, the first input part 14 and the second input part 24 are connected to the substrate 23 by the wirings and transmit and receive signals to and from the CPU 23b of the substrate 23. The power is supplied from the battery 22 to the respective input parts 14, 24, based on the signal from the CPU 23b. The first input part 14 and the second input part 24 detect the instruction positions of the respective display surfaces 13b, 25d, to which the user is contacted, by the position sensors 14a, 24a. Thereby, the first input part 14 detects an input on the first display part 13 and the second input part 24 detects an input on the second display part 25. Then, the respective input parts 14, 24 output the position signals to the CPU 23b.

In addition, the first input part 14 detects the light from a photographic subject, which is reflected in the first display surface 13b, by the image sensor 14b and converts the light into an image signal by photoelectric conversion, thereby outputting the image signal to the CPU 23b of the substrate 23.

The CPU 23b acquires image data such as photograph, picture, figure and the like in response to an instruction from the user, a request from software and the like. The image data is acquired by the readout from the memory 23c, reception by the Internet and the like. The CPU 23b outputs the image data to the first display part 13 and the second display part 25, respectively, as signals, thereby displaying images on the respective display parts 13, 25. The CPU 23b can not only display the separate images on the respective display parts 13, 25 but also divide and display one image thereon. In the meantime, when the image is displayed on the second display part 25, the CPU 23b supplies the power from the battery 22 to the light emitting part 25c, thereby allowing the light emitting part 25c to emit the light.

In addition, the CPU 23b receives the position signals from the position sensors 14a, 24a of the respective input parts 14, 24, thereby executing processes relating to the position signals. For example, a position table is stored in the memory 23c. In the position table, positions of icons in the respective display parts 13, 25, files and programs (applications) indicated by the icons, and the like are associated. When the position signals are input from the position sensors 14a, 24a, the CPU 23b uses the position table to specify an icon that has been operated by the user and to thus execute a program and the like corresponding to the icon.

In addition, the CPU 23b receives and processes the image signal from the image sensor 14b of the first input part 14. For example, when the image signal is received, the CPU 23b specifies the characters included in the image of the image signal by Optical Character Recognition (OCR) and the like, thereby acquiring character data.

<Operations of Portable Terminal Apparatus>

Figure 14A:
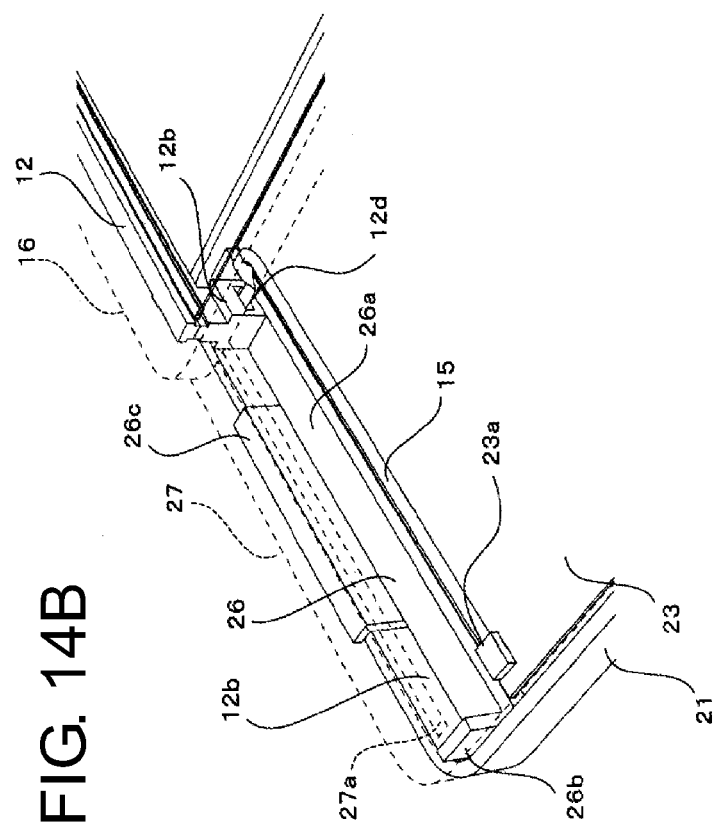
FIGS. 14A and 14B are perspective views showing states of a wiring according to an illustrative embodiment.
Figure 14B:
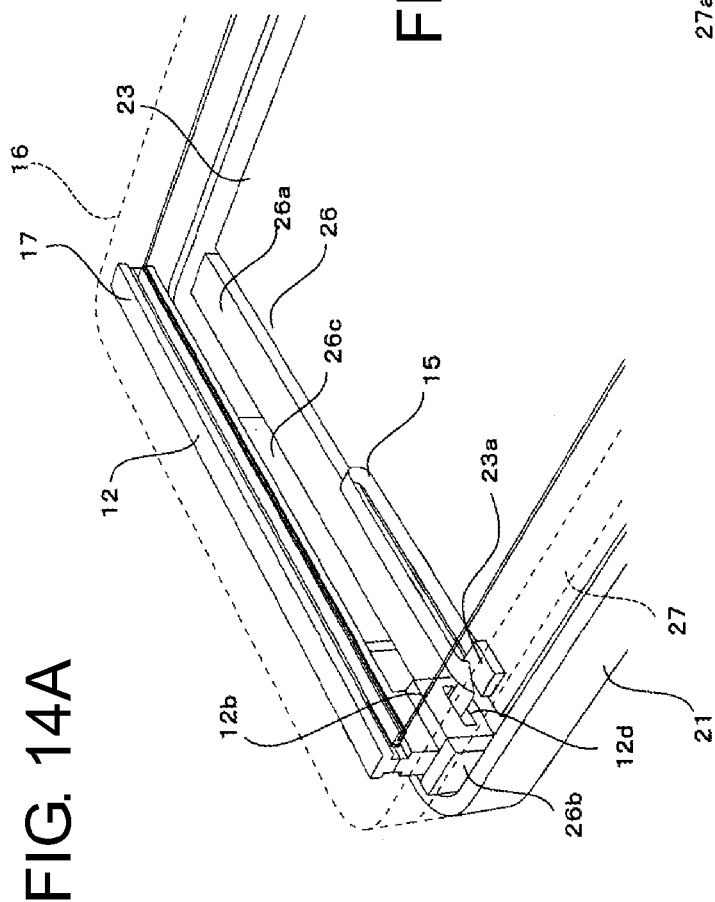

FIG. 13A is a perspective view showing a state in which the first unit 10 and the second unit 20 are overlapped. FIG. 13B is a perspective view showing a state in which the first unit 10 and the second unit 20 are arranged laterally. FIG. 14A is a perspective view showing the wiring 15 when the first unit 10 and the second unit 20 are overlapped. FIG. 14B is a perspective view showing the wiring 15 when the first unit 10 and the second unit 20 are arranged laterally. In FIGS. 14A and 14B, the parts such as first cover part 16 and the like are shown with the dotted lines so as to easily see the wiring 15.

As shown in FIGS. 2A and 2B, the portable terminal apparatus 100 can switch between the first position shown in FIG. 2A and the second position shown in FIG. 2B by a switching part.

In the first position, the first unit 10 is overlapped over the second unit 20 and the first display surface 13b and the second display surface 25d face upwards. As shown in FIG. 13A, the size of the first display surface 13b is the substantially same as that of the second display surface 25d, and the first display surface 13b faces outwards.

In the first position, as shown in FIG. 14A, the engagement part 12b of the slide part 12 contacts the first side plate 26b of the bearing part 26 at one end of the guide hole 27a and the slide part 12 covers the guide hole 27a. The engagement part 12b is positioned near the connector 22a of the substrate 23. The wiring 15 extends along the bottom surface of the bearing part 26 from the through-hole 12d of the engagement part 12b and is bent and folded on the way, so that it returns to the through-hole 12d while extending the bottom surface of the bearing part 26 and is then connected to the connector 23a.

In the second position, as shown in FIG. 2B, the first unit 10 is withdrawn to the side of the second unit 20 and both the first display surface 13b and the second display surface 25d faces upwardly outwards. As shown in FIG. 13B, an end portion of the first unit 10 is slightly overlapped with an end portion of the second display surface 25d and the first display surface 13b and the second display surface 25d are arranged laterally without a gap. At this time, an end portion of the first display surface 13b may be slightly overlapped with the end portion of the second display surface 25d.

In the second position, as shown in FIG. 14B, the engagement part 12b of the slide part 12 is moved from one end of the guide hole 27a to the other end, so that the guide hole 27a is opened. The engagement part 12b becomes distant from the connector 23a and the wiring 15 extends straightly toward the connector 23a of the substrate 23 through the through-hole 12d of the engagement part 12b.

The switching part includes a sliding mechanism that relatively slides the first unit 10 and the second unit 20. As shown in FIGS. 3A and 3B, the sliding mechanism includes the slide parts 12 that are provided to the first unit 10 and the guide holes 27a that are provided to the second unit 20. The engagement parts 12b of the slide parts 12 protrude from the first unit 10 to the second unit 20, so that they are fitted into the guide holes 27a. The first unit 10 except for the engagement parts 12b is arranged on the second unit 20. Therefore, as the engagement parts 12b are moved along the guide holes 27a, the first unit 10 slides on the second unit 20.

<Functions of Portable Terminal Apparatus>

As shown in FIG. 13B, in the second position, an image of dial keys is displayed on the first display surface 13b, based on the image signal from the CPU 23b. The external natural light is incident on the transparent first display part 13 and penetrates a background part except for the image of dial keys, so that the background part becomes transparent on the first display surface 13b. In the second display part 25, the light of the light emitting part 25c is illuminated on the liquid crystal panel 25a through the light guide plate 25b, and an image of a photograph is displayed on the second display surface 25d based on the image signal from the CPU 23b. When the portable terminal apparatus is switched from the second position to the first position, the first unit 10 is overlapped over the second unit 20. As shown in FIG. 13A, the photograph image of the second display part 25 penetrates the transparent background part of the first display surface 13b, so that the second display surface 25d is used as a background of the first display surface 13b. In addition, the light from the light emitting part 25c of the second display part 25 is also illuminated to the first display part 13, so that the light is used as the illumination of the first display part 13.

Figure 15:
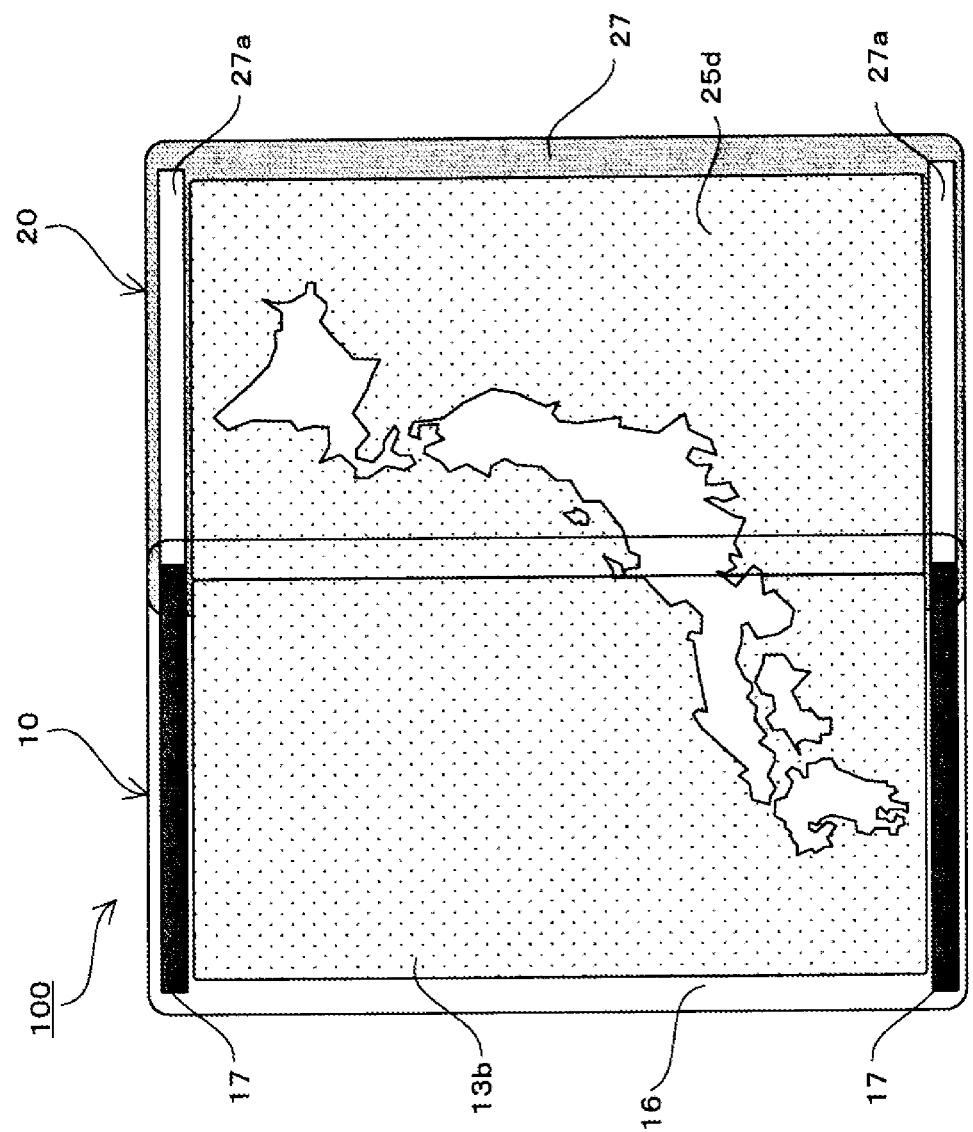
FIG. 15 is a view for illustrating a function of the portable terminal apparatus according to an illustrative embodiment.

FIG. 15 is a view for illustrating a function of displaying one image with the two display parts 13, 25.

As shown in FIG. 15, the CPU 23b acquires image data of a map from the memory 23c and the like, divides the image data so that an image is divided into two areas, and outputs the respective image data to the respective display parts 13, 25, as signals. A half of the image is displayed on the first display surface 13b and the other half of the image is displayed on the second display surface 25d. In the second position, the first display surface 13b and the second display surface 25d are arranged laterally without a gap, so that the image of the first display surface 13b and the image of the second display surface 25d are continuous. In addition, since the second display surface 25d is arranged below the transparent end portion of the first unit 10 and the image of the second display surface 25d penetrates the transparent end portion, the continuous images are displayed on a display surface that is enlarged by the two display surfaces 13b, 25d, without being interrupted on the way.

Figure 16:
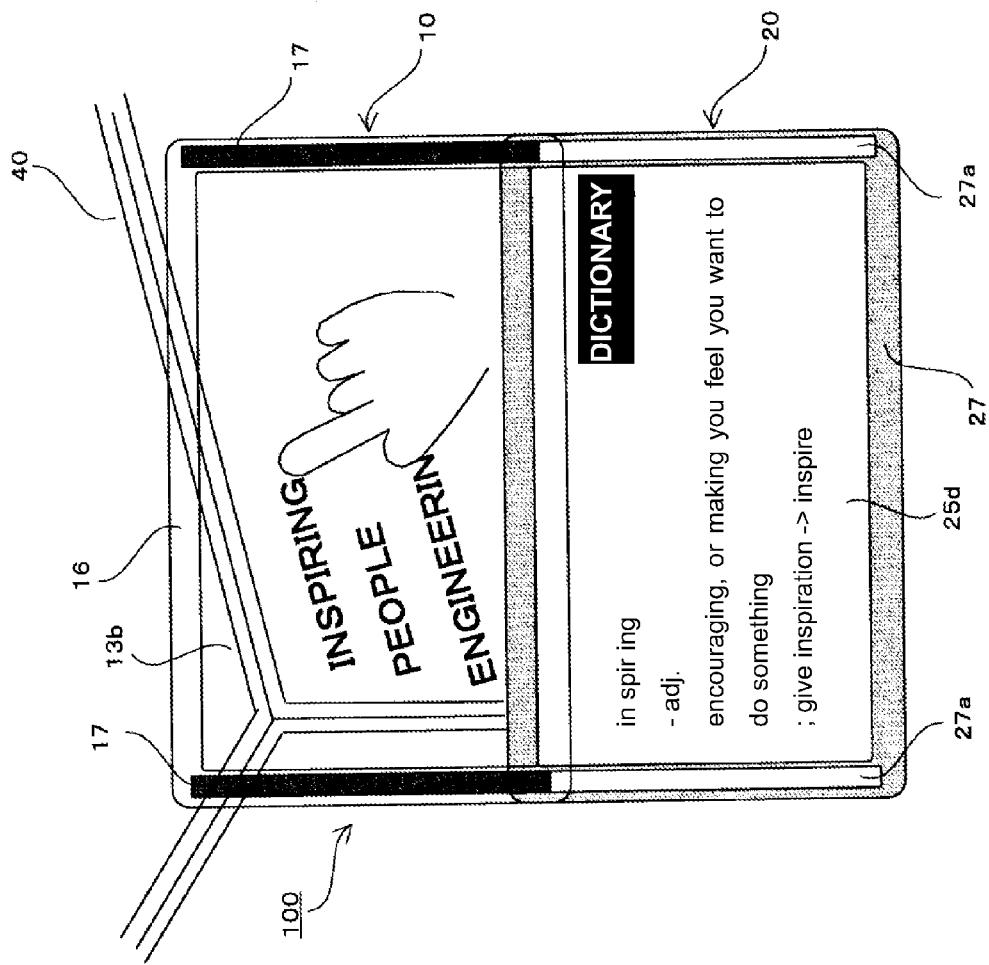
FIG. 16 is a view for illustrating a function of the portable terminal apparatus according to an illustrative embodiment.

FIG. 16 is a view for illustrating a function of acquiring information designated by a user from information such as characters projected on the first display surface 13b of the first unit 10.

As shown in FIG. 16, in the second position, when a user puts the first unit 10 over characters written on a surface of a product box 40 and the like, the characters are projected on the first display surface 13b through the transparent first unit 10. The user designates a range of characters that the user wants to acquire by a dragging operation with a finger, for example. The position sensor 14a of the first input part 14 detects the operated position and transmits a position signal to the CPU 23b. In addition, the image projected on the first display surface 13b is acquired by the image sensor 14b of the first input part 14, so that an image signal is transmitted to the CPU 23b. The CPU 23b receives the position signal and the image signal and determines a range that is operated by the user, based on the position signal. The CPU 23b extracts an image of the operated range from the image signal and specifies the characters included in the image by the OCR and the like.

Then, when the user clicks a dictionary icon on the second display surface 25d, the position sensor 25a of the second input part 25 detects the instruction position and outputs a position signal to the CPU 23b. The CPU 23b receives the position signal and specifies a dictionary program corresponding to the position signal from the position table, thereby executing the dictionary program. Then, the CPU 23b input the above specified characters into the dictionary program to obtain an output result from the dictionary program. The CPU 23b outputs the output result to the second display part 25, as an image signal, thereby displaying the output result on the second display surface 25d.

<Effects of Portable Terminal Apparatus>

According to the above illustrative embodiment, the wiring 15 of the first display part 13 and the first input part 14 passes through the through-hole 12d of the engagement part 12b and the guide hole 27a and is hidden by the covering part 17. In addition, the first display part 13 is configured by the transparent liquid crystal display. Furthermore, the first bottom part 11 and the first cover part 16 are formed of the transparent resins. Thereby, in the first unit 10, the parts except for the covering parts 17 are transparent and the opposite side can be seen through the first display surface 13b and the frame surrounding the first display surface 13b. Accordingly, it is possible to provide the portable terminal apparatus with the various functions using the opposite landscape.

For example, a user can easily adjust the first display surface 13b relatively to the object (information such as image, character and the like) while seeing the opposite landscape projected on the first display surface 13b through the transparent part of the first unit 10. Thereby, the user can touch the first display surface 13b and instructs the acquirement of the object appearing through the first display part 13, thereby directly acquire the object to the first display surface 13b.

According to the above illustrative embodiment, in the first position, the second display surface 25d is projected through the transparent part of the first display surface 13b, so that it is possible to display an image (refer to FIGS. 13A and 13B) obtained by combining the image of the first display surface 13b and the image of the second display surface 25d. Accordingly, it is possible to variously display the images.

According to the above illustrative embodiment, the portable terminal apparatus 100 is switched from the first position to the second position by the switching parts 12, 27a, so that the first display surface 13b and the second display surface 25d are arranged in parallel with each other and the second display surface 25d can be seen through the transparent frame (end portions of the first unit 10) surrounding the first display surface 13b. Therefore, the image of the first display surface 13b and the image of the second display surface 25d are continuous without being interrupted on the way by the frame such that one image is displayed over the first display surface 13b and the second display surface 25d. Thus, the first display surface 13b and the second display surface 25d are integrally used. In addition, when the display surfaces are expanded, it is possible to favorably display the image on the expanded display surfaces.

According to the above illustrative embodiment, in the first position, the light emitted from the light emitting part 25c penetrates the transparent first unit 10 and illuminates the first display part 13. Therefore, even when the sufficient light cannot be obtained, it is possible to see the image displayed on the first display surface 13b by the light of the second display part 25.

<Configurations of Modified Embodiment>

Figures 17A, 17B:
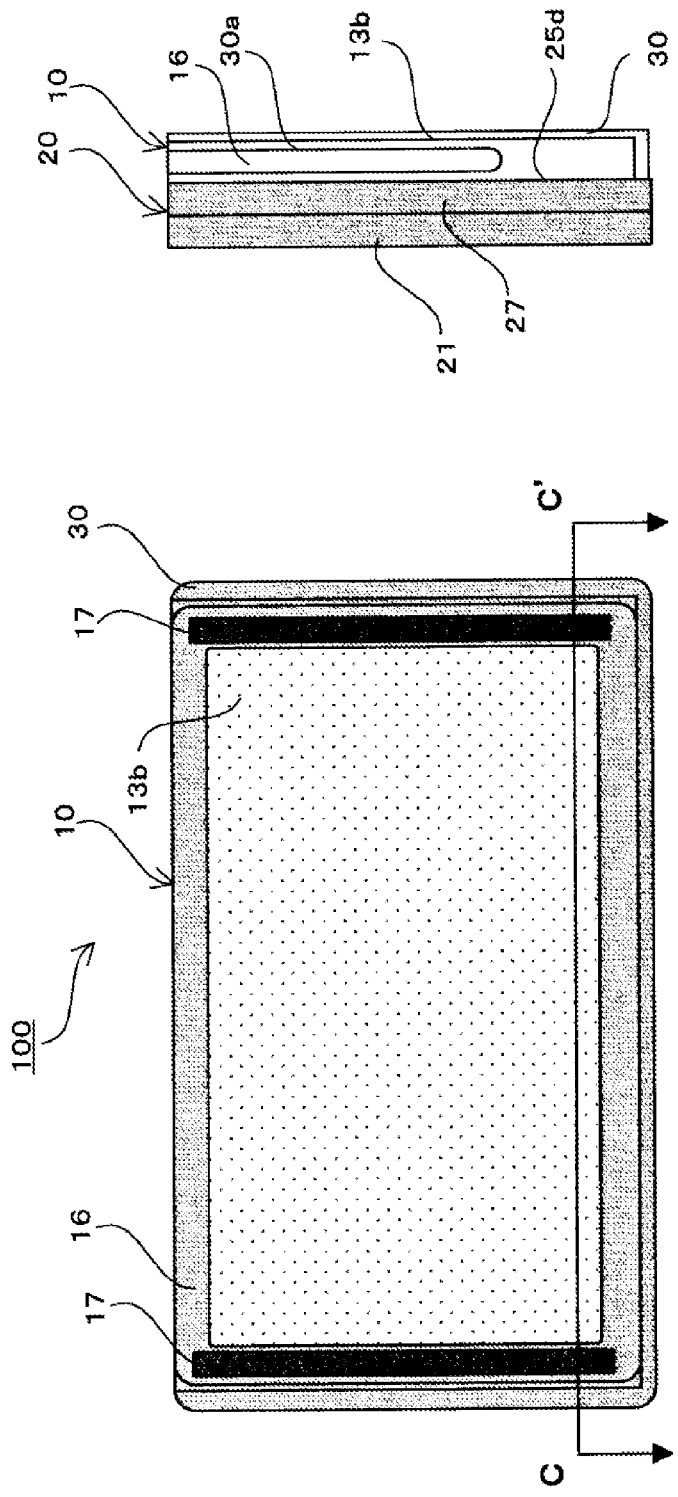
FIGS. 17A and 17B show a portable terminal apparatus of a first position according to a first modified embodiment.
Figure 18B:
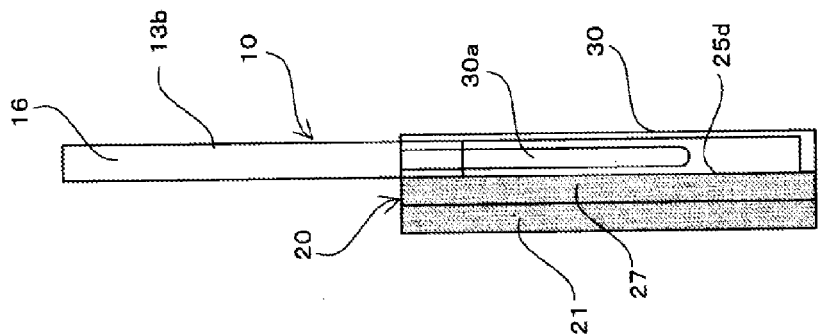
FIGS. 18A and 18B show the portable terminal apparatus of a second position according to the first modified embodiment.
Figure 18A:
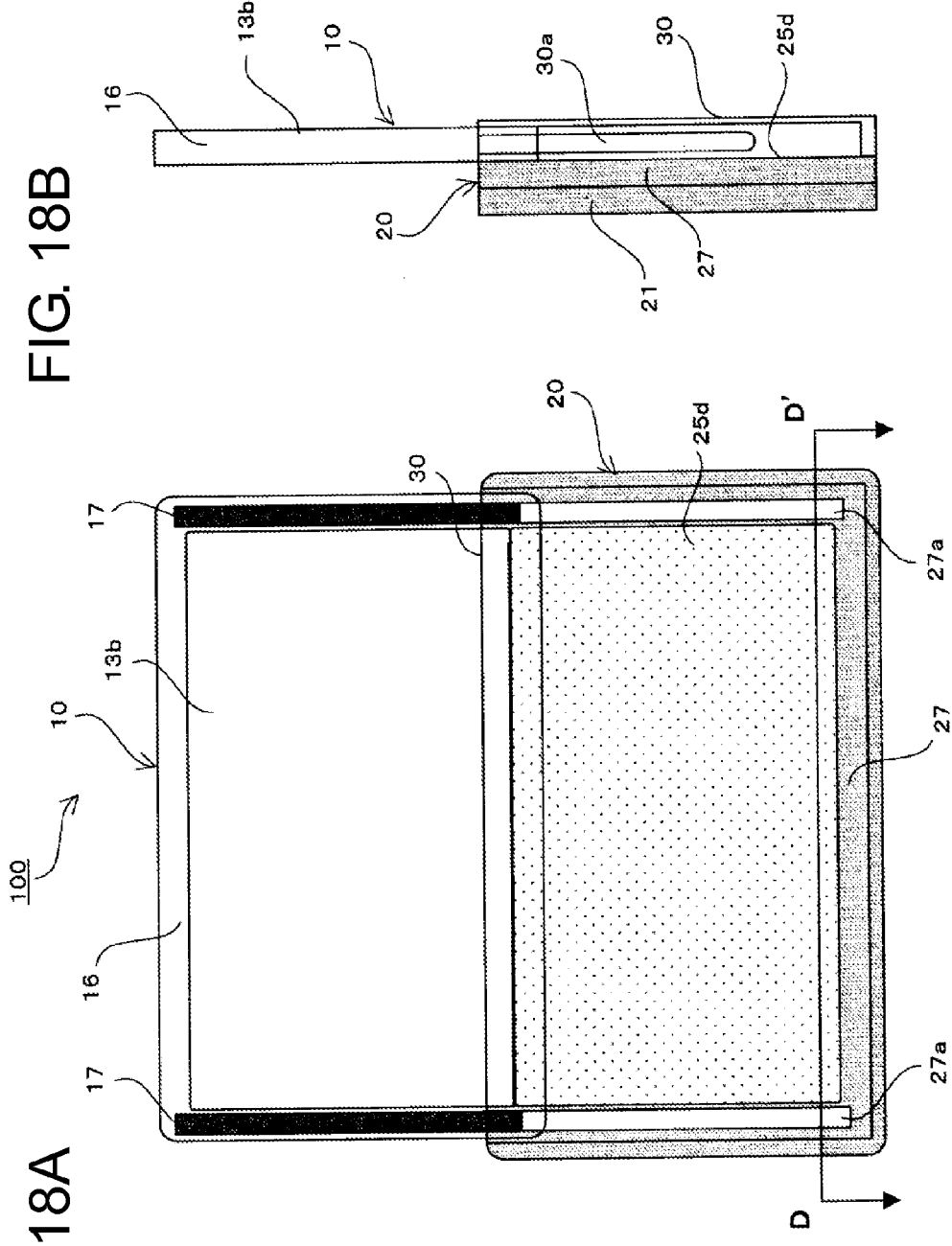
Figure 19A:
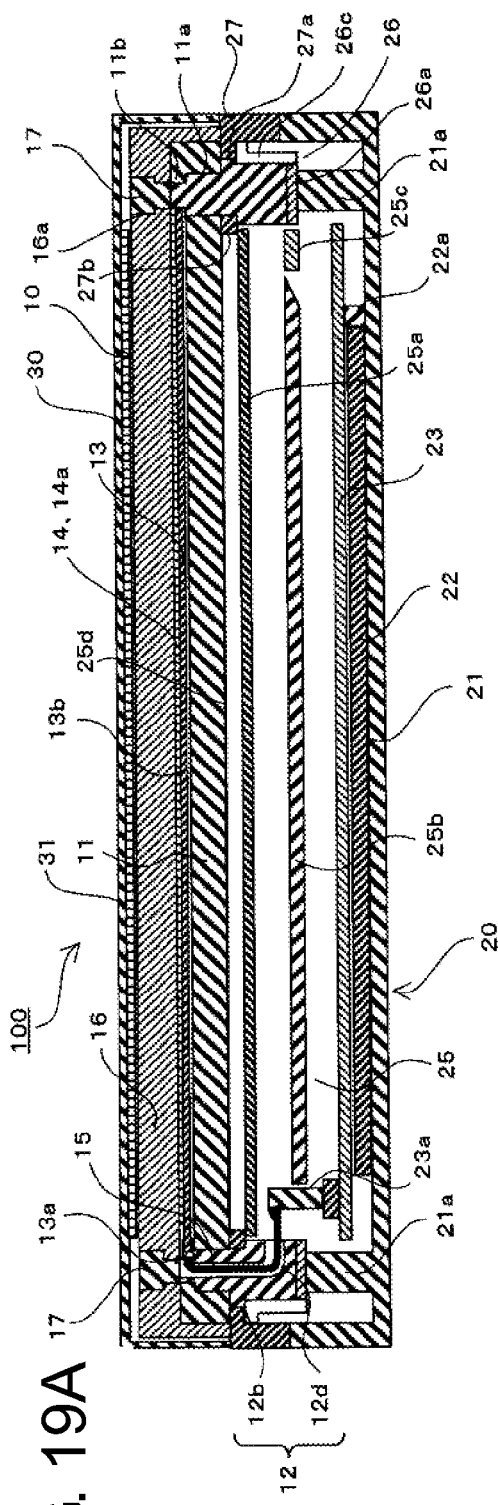
FIGS. 19A and 19B are sectional views showing the portable terminal apparatus according to the first modified embodiment.
Figure 19B:
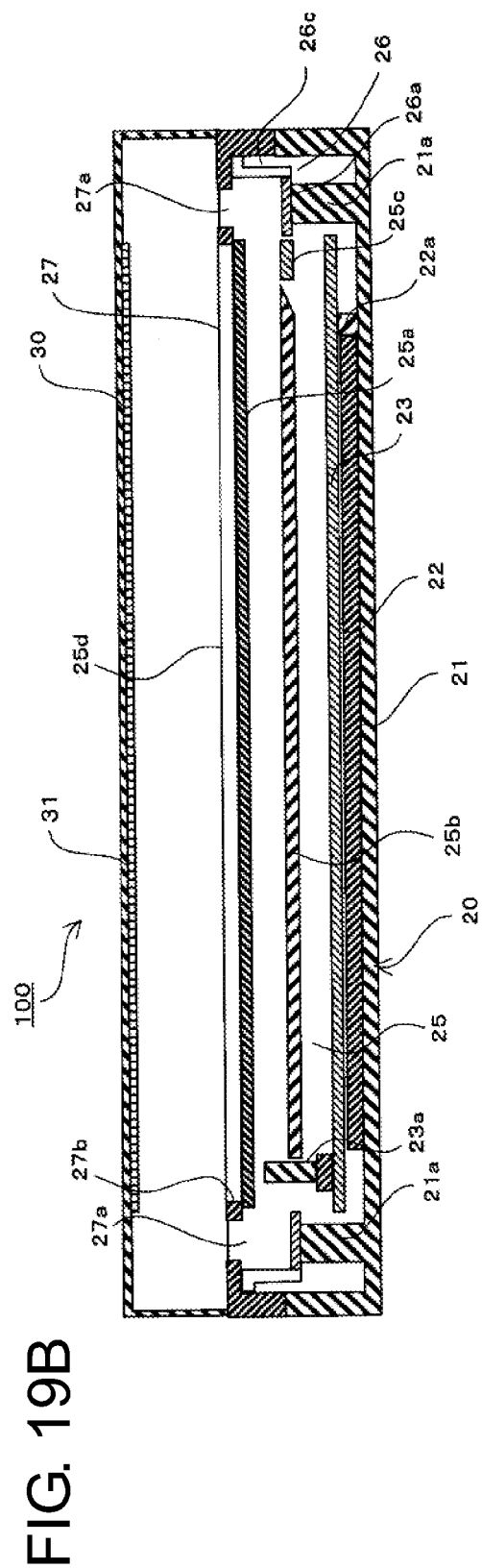

FIG. 17A is a plan view showing a front side of the portable terminal apparatus 100 of the first position according to a modified embodiment. FIG. 17B is a plan view showing a side of the portable terminal apparatus 100 of the first position. FIG. 18A is a plan view showing a front side of the portable terminal apparatus 100 of the second position. FIG. 18B is a plan view showing a side of the portable terminal apparatus 100 of the second position. FIG. 19A is a sectional view taken along a line C-C' of FIG. 17A. FIG. 19B is a sectional view taken along a line D-D' of FIG. 18A.

The configuration of the portable terminal apparatus 100 according to the modified embodiment is the substantially same as that of the above portable terminal apparatus 100. However, the portable terminal apparatus 100 according to the modified embodiment is different from the above portable terminal apparatus 100, in that a transparent cover 40 covering the first unit 10 in the first position is further provided and a third input part 31 is provided instead of the second input part 25. In addition, the portable terminal apparatus 100 according to the modified embodiment is different from the above portable terminal apparatus 100 with respect to the size of the second unit 20 and the position of the input part. In the meantime, the same configurations as the above portable terminal apparatus 100 are indicated by the same reference numerals and the descriptions thereof are omitted.

The second cover part 27 and the second bottom part 21 of the second unit 27 are expanded in the lateral direction (in front-rear direction and a left-right direction) and the respective sizes are larger than those of the first cover part 16 and the first bottom part 11 of the first unit 10.

The cover 30 is injection-molded by a transparent resin. The cover 30 has a front surface, a bottom surface and two side surfaces and each of the surfaces has a rectangular shape. The side surfaces are formed with slits 30a.

The side surfaces of the cover 30 are arranged in parallel with the guide holes 27a outside the guide holes 27a. The bottom surface of the cover 30 is arranged at an opposite side to the side from which the first unit 10 is withdrawn. The both side surfaces and bottom surface of the cover 30 are connected to the peripheral part of the second cover part 27 by an adhesive and the like.

As shown in FIGS. 19A and 19B, a touch panel is used as the third input part 31. The touch panel is a transparent sheet having a rectangular shape. In the touch panel, two transparent electrodes (not shown) are inserted in a matrix shape and wirings (not shown) are connected to the transparent electrodes. In the first position, the third input part 31 is opposed to the first display surface 13b at the front of the cover 30. In the second position, the third input part 31 is opposed to the second display surface 25d at the front of the cover 30. The third input part 31 is connected to the substrate 23 and the batter 22 by wirings (not shown). A size of the third input part 31 is the substantially same as that of the first input part 14.

A magnet (not shown) is arranged in the first unit 10 and an opening and closing sensor (not shown) is arranged in the second unit 20. The opening and closing sensor is arranged adjacent to the first side plate 26b of the bearing 26 and the magnet is arranged at a position near the opening and closing sensor in the first position. The opening and closing sensor is connected to the CPU 23b of the substrate 23 by a wiring (not shown).

<Operations of Modified Embodiment>

As shown in FIGS. 17A and 17B, in the first position, the front of the cover 30 is arranged at an interval with respect to the first display surface 13b while facing the first display surface 13b. The interval between the front and the second cover part 27 is slightly larger than a thickness of the first unit 10. In addition, a size of the front is larger than that of the first unit 10 and is the same as that of the second unit 20. Therefore, in the first position, the first unit 10 is received in a space that is surrounded by the second unit 20 and the cover 30.

When the fingers are inserted through the respective slits 30a formed at both sides of the cover 30 and the first unit 10 is slid toward an opening of the cover 30 with being held by the fingers, the portable terminal apparatus 100 is switched from the first position to the second position.

As shown in FIGS. 18A and 18B, in the second position, the first unit 10 is withdrawn to the side of the second unit 20 and the first display surface 13b and the second display surface 25d are exposed. At this time, the second display surface 25d is opposed to the front of the cover 30.

The opening and closing sensor is connected to the substrate 23 by the wiring 15 and transmits and receives a signal to and from the CPU 23b of the substrate 23. When the magnet exists near the opening and closing sensor in the first position, the opening and closing sensor detects a magnetic field of the magnet and outputs a detection signal to the CPU 23b. On the contrary, when the magnet is distant from the opening and closing sensor in the second position, the opening and closing sensor does not detect a magnetic field of the magnet and does not output a detection signal to the CPU 23b.

When the detection signal is input from the opening and closing sensor, the CPU 23b determines that the portable terminal apparatus 100 is in the first position. In the first position, as shown in FIG. 19A, the third input part 31 is opposed to the first display surface 13b. Accordingly, the CPU 23b switches the third input part 31 as an input part with respect to the first display surface 13b. Thereby, the third input part 31 detects an input operation on the first display part 13, instead of the first input part 14. Then, the CPU 23b receives a position signal from the third input part 31 and executes a process relating to the position signal. When an image signal is generated as the process is executed, the CPU 23b outputs the image signal to the first display part 13, thereby displaying an image on the first display surface 13b.

On the other hand, when a detection signal is not input from the opening and closing sensor, the CPU 23b determines that the portable terminal apparatus 100 is in the second position. In the second position, as shown in FIG. 19B, the third input part 31 is opposed to the second display surface 25d. Accordingly, the CPU 23b switches the third input part 31 as an input part with respect to the second display part 25 and uses the first input part 14 as an input part with respect to the first display part 13. Thereby, the third input part 31 detects an input operation on the second display part 25. Then, when a position signal is received from the third input part 31, the CPU 23b associates an instruction position of the position signal and an image of the second display surface 25d and executes a predetermined process. In addition, the CPU 23b receives a position signal from the position sensor 14a of the first input part 14 and receives an image signal from the image sensor 14b of the first input part 14. Then, the CPU 23b associates the position signal, the image signal and the image signal displayed on the first display surface 13b and executes a predetermined process.

<Effects of Modified Embodiment>

According to this modified embodiment, in the first position, the first unit 10 is received in the cover 30 and is protected by the cover 30. For example, without the cover 30, when external force is applied to the first unit 10 in the lateral direction, the force is applied to the connection part of the first unit 10 and the second unit 20, so that the thin engagement part 12b that is the connection part may be damaged. Compared to this, when the first unit 10 is received in the cover 30, the cover 30 bears the external force and the external fore is not directly applied to the first unit 10. Accordingly, the portable terminal apparatus 100 is less damaged. Thereby, it is easy to take along the portable terminal apparatus 100 in the first position.

In addition, according to this modified embodiment, the input target of the third input part 31 is switched into the first input part 13 or second display part 25 depending on the first and second positions. Even when the position of the portable terminal apparatus 100 is changed, it is possible to perform the input operation to the respective display parts 13, 25 by the third input part 31 mounted to the cover 30 while seeing the first display surface 13b or second display surface 25d through the transparent cover 30.

<Other Modified Embodiments>

While the present invention has been shown and described with reference to certain illustrative embodiments thereof, it will be understood by those skilled in the art that various changes in form and details may be made therein without departing from the spirit and scope of the invention as defined by the appended claims.

For example, in the above embodiments, the flexible wiring 15 is used as the wiring 15. However, a coaxial wiring may be used as the wiring 15.

In the above embodiments, in the first position, the second display part 25 is arranged below the first display part 13 and the first display part 13 faces outwards. On the contrary, in the first position, the first display part 13 may be arranged below the second display part 25 and the second display part 25 may face outwards. In this case, however, in the first position, it is not possible to display an image by using both the first display part 13 and the second display part 25. Accordingly, as the above embodiments, it is preferable that the second display part 25 is arranged below the first display part 13 having a transparent liquid crystal display.

In the above embodiments, the electrostatic touch panels are used as the position sensors of the respective input parts 14, 24, 31 and the position sensors are mounted on the inner surfaces of the respective cover parts 16, 27 and the cover 30. Instead, a pressure-sensitive touch panel and the like may be used as the position sensor and the position sensors may be mounted on the outer surfaces of the respective cover parts 16, 27 and the cover 30.

Figure 20B:
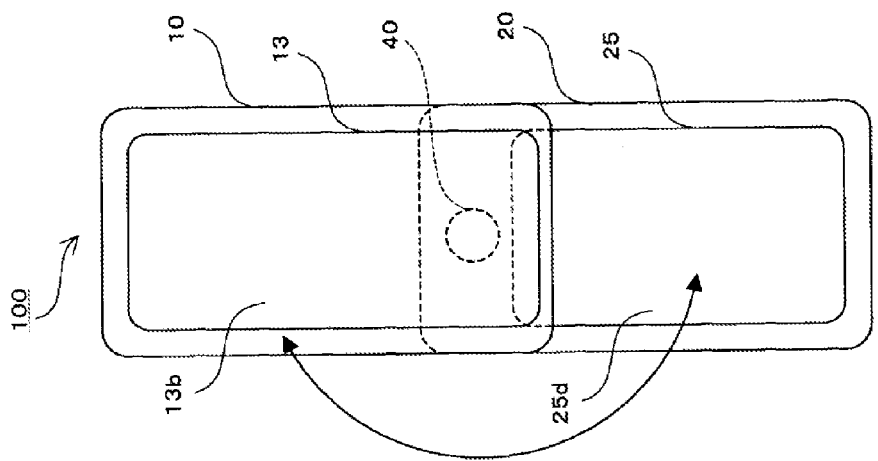
FIGS. 20A and 20B are front views showing a portable terminal apparatus according to another modified embodiment.
Figure 20A:
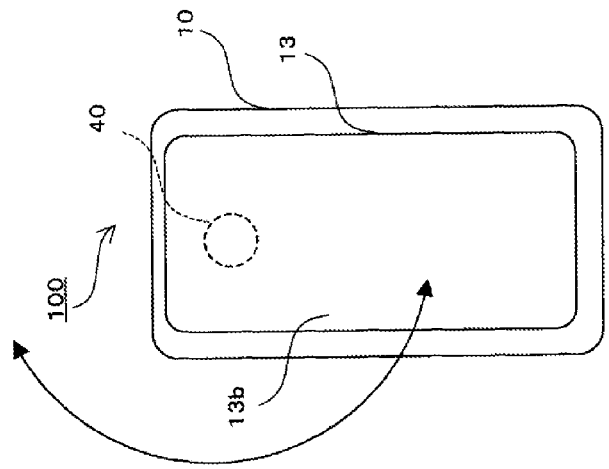

In the above embodiments, the first unit 10 slides in the lateral direction with respect to the second unit 20, so that the portable terminal apparatus is switched between the first and second positions. However, as shown in FIGS. 20A and 20B, the first unit 10 and the second unit 20 may be connected by a rotational shaft 40 and the first unit 10 may be rotated in the lateral direction with respect to the second unit 20. In this case, as shown in FIG. 20A, in the first position, the first unit 10 (first display part 13) is overlapped over the second unit 20 (second display part 25) and the first display surface 13a is exposed to the outside. Then, as shown in FIG. 20B, in the second position, the first unit 10 and the second unit 20 are arranged in a straight line and the first display surface 13b and the second display surface 25d are exposed to the outside. The rotational shaft 40 is covered by the first display part 13 of the first unit 10. Although the first unit 10 is transparent, when an image is displayed on the first display part 13, the rotational shaft is hidden by the image. Since the rotational shaft 40 is hidden and the outward appearance is thus improved, even when the portable terminal apparatus 100 turns off, an image may be displayed on a portion of the first display part 13 corresponding to the rotational shaft 40.

What is claimed is:

1. A portable terminal apparatus comprising:
   a first unit including a first display part and a frame surrounding the first display part, the frame having a transparent end portion at one side end of the first unit;
   a second unit including a second display part;
   a switching part configured to cause the first unit and the second unit to switch between a first position in which the first unit covers the second display part and a second position in which at least a part of the second display part is exposed to an outside and a part of the second display part is provided below the transparent end portion of the first unit; and
   a controller configured to control the first display part and the second display part,
   wherein the first unit is configured such that an opposite side of the first unit is visible through the first display part, and
   wherein, in the second position, the controller is configured to display an image divided into a first area on the first display part and a second area on the second display part such that the image appears continuous from the first area to the second area without a gap.

2. The portable terminal apparatus according to claim 1, wherein the first unit includes a first input part configured to detect an input on the first display part, and
   wherein the second unit includes a second input part configured to detect an input on the second display part.

3. The portable terminal apparatus according to claim 1, wherein the first display part includes a transparent liquid crystal display.

4. The portable terminal apparatus according to claim 1, wherein the switching part includes a sliding mechanism configured to cause the first unit and the second unit to slide with respect to each other, and
   wherein in the second position, the first display part and the second display part are arranged in a direction parallel with display surfaces of the respective display parts.

5. The portable terminal apparatus according to claim 1, wherein the first unit includes a frame part surrounding a display surface of the first display part, the frame part being transparent.

6. The portable terminal apparatus according to claim 4, further comprising:
   a wiring configured to supply power to the first display part from the second unit,
   wherein the sliding mechanism includes a slide part provided to the first unit, and a guide hole provided to the second unit, and the slide part is slidable along the guide hole,
   wherein the slide part is formed with a hole portion, and
   wherein the wiring passes through the hole portion and the guide hole.

7. The portable terminal apparatus according to claim 1, further comprising:
   a transparent cover configured to cover the first unit in the first position.

8. The portable terminal apparatus according to claim 1, wherein the switching part is configured to cause the first unit and second unit to switch between the first position and the second position by the first unit being moved with respect to the second unit in parallel to the second display part.

9. A portable terminal apparatus comprising:
   a first unit including a transparent first display part;
   a second unit including a second display part;
   a wiring configured to supply power to the first display part from the second unit; and
   a switching part including a sliding mechanism configured to cause the first unit and the second unit to slide with respect to each other so as to switch between a first position in which the first unit covers the second display part and a second position in which at least a part of the second display part is exposed to an outside,
   wherein the first unit is configured such that an opposite side of the first unit is visible through the first display part,
   wherein in the second position, the first display part and the second display part are arranged in a direction parallel with display surfaces of the respective display parts,
   wherein the sliding mechanism includes a slide part provided to the first unit, and a guide hole provided to the second unit, and the slide part is slidable along the guide hole while being guided by the guide hole,
   wherein the slide part is formed with a hole portion, and
   wherein the wiring passes through the hole portion and the guide hole.

10. The portable terminal apparatus according to claim 9, wherein the first unit further includes an opaque covering part, and
    wherein the opaque covering part covers the slide part and the guide hole.

* * * * *